(12) United States Patent
Hoge et al.

(10) Patent No.: US 11,109,663 B2
(45) Date of Patent: Sep. 7, 2021

(54) BACKPACK SYSTEM WITH INTERCHANGEABLE ELEMENTS

(71) Applicant: ROKMAN, LLC, Rexburg, ID (US)

(72) Inventors: Evan A. Hoge, Rigby, ID (US); Zachary K. Hillman, St. Anthony, ID (US); Brandon J. Bair, St. Anthony, ID (US)

(73) Assignee: ROKMAN, LLC, Rexburg, ID (US)

( * ) Notice: Subject to any disclaimer, the term of this patent is extended or adjusted under 35 U.S.C. 154(b) by 0 days.

(21) Appl. No.: 15/928,045

(22) Filed: Mar. 21, 2018

(65) Prior Publication Data

US 2018/0271261 A1     Sep. 27, 2018

Related U.S. Application Data

(60) Provisional application No. 62/474,443, filed on Mar. 21, 2017.

(51) Int. Cl.
| | | |
|---|---|---|
| *A45F 3/08* | (2006.01) | |
| *A45F 3/04* | (2006.01) | |
| *A45F 5/00* | (2006.01) | |
| *A01M 31/00* | (2006.01) | |
| *A45F 3/00* | (2006.01) | |

(52) U.S. Cl.
CPC ............. *A45F 3/08* (2013.01); *A01M 31/006* (2013.01); *A45F 3/04* (2013.01); *A45F 3/047* (2013.01); *A45F 5/00* (2013.01); *A45F 2003/003* (2013.01); *A45F 2003/045* (2013.01); *A45F 2005/002* (2013.01)

(58) Field of Classification Search
CPC .... A45F 3/08; A45F 3/04; A45F 5/00; A01M 31/006
USPC .................................................. 224/583, 153
See application file for complete search history.

(56) References Cited

U.S. PATENT DOCUMENTS

| | | | | |
|---|---|---|---|---|
| 1,505,661 | A | | 8/1924 | Nelson |
| 2,996,228 | A | * | 8/1961 | Bauman ................ A01M 31/00 224/184 |
| 3,074,074 | A | * | 1/1963 | Lovering .............. A01M 31/00 2/94 |
| 3,219,243 | A | | 11/1965 | Mack |

(Continued)

OTHER PUBLICATIONS

U.S. Appl. No. 15/928,051, Office Action, dated Nov. 13, 2019, pp. 1-23.

*Primary Examiner* — Nathan J Newhouse
*Assistant Examiner* — Lester L Vanterpool
(74) *Attorney, Agent, or Firm* — Kunzler Bean & Adamson; Bruce R. Needham

(57) ABSTRACT

A backpack apparatus is disclosed. The backpack apparatus includes a backpack harness, an external frame, and a backpack. The backpack harness includes a vertical support element, shoulder straps, and a hip belt. The shoulder straps and hip belt couple to the vertical support element. The backpack harness includes a first portion of a coupling mechanism. The external frame includes a second portion of the coupling mechanism. The external frame releasably couples to the backpack harness by coupling the first portion to the second portion. The backpack releasably couples to the backpack harness by coupling a first portion of the coupling mechanism on the backpack harness to a second portion of the coupling mechanism on the backpack. The backpack releasably couples to the external frame.

19 Claims, 15 Drawing Sheets

(56) References Cited

U.S. PATENT DOCUMENTS

| | | | |
|---|---|---|---|
| 3,265,260 A | 8/1966 | Heiner | |
| 3,282,483 A | 11/1966 | Babcock | |
| 3,536,237 A * | 10/1970 | Greenman | A45F 3/10 224/262 |
| 3,563,431 A * | 2/1971 | Pletz | A45F 3/08 224/262 |
| 3,648,907 A * | 3/1972 | Romney | A45F 3/08 224/153 |
| 3,733,017 A * | 5/1973 | Pletz | A45F 3/08 224/634 |
| 3,827,612 A | 8/1974 | Mead et al. | |
| 3,889,859 A * | 6/1975 | Joseph | A45F 3/08 224/634 |
| 3,921,867 A | 11/1975 | Farnbach | |
| 3,938,718 A * | 2/1976 | Madison | A45F 3/10 224/262 |
| 4,015,759 A * | 4/1977 | Dreissigacker | A45F 3/10 224/262 |
| 4,018,370 A * | 4/1977 | Wood | A45F 3/10 224/263 |
| 4,040,548 A * | 8/1977 | Guglielmo | A45F 3/08 224/262 |
| 4,132,427 A * | 1/1979 | McGee | B62B 5/068 280/19 |
| 4,135,654 A * | 1/1979 | Chu | A45F 3/08 224/261 |
| 4,431,121 A * | 2/1984 | Bensette | A01M 31/00 224/153 |
| 4,676,418 A * | 6/1987 | Lowe | A45F 3/08 224/262 |
| 4,706,858 A * | 11/1987 | Whatley | A01M 31/00 2/94 |
| 5,381,941 A | 1/1995 | Brune | |
| D370,090 S | 5/1996 | Coggins | |
| 5,553,759 A * | 9/1996 | McMaster | A45F 3/08 224/259 |
| 5,564,612 A * | 10/1996 | Gregory | A45F 3/08 224/633 |
| 5,704,530 A * | 1/1998 | Scherer | A45F 3/047 224/632 |
| 5,762,243 A * | 6/1998 | McMaster | A45F 3/08 224/262 |
| 5,862,967 A | 1/1999 | Johnson | |
| 5,904,282 A * | 5/1999 | Gleason | A45F 3/047 224/635 |
| 5,954,253 A * | 9/1999 | Swetish | A45F 3/08 224/631 |
| 5,984,157 A * | 11/1999 | Swetish | A45F 3/10 224/631 |
| 6,006,968 A * | 12/1999 | McCarthy | A01M 31/00 224/184 |
| 6,135,333 A | 10/2000 | Tucker et al. | |
| 6,135,334 A * | 10/2000 | Seichter | A45F 3/04 224/250 |
| 6,216,926 B1 * | 4/2001 | Pratt | A45F 3/04 224/148.2 |
| 6,382,489 B2 * | 5/2002 | Chuang | A45F 3/04 224/153 |
| 6,394,039 B1 | 5/2002 | Grauer | |
| 6,508,077 B1 | 1/2003 | Vander Boegh et al. | |
| 6,510,705 B1 | 1/2003 | Jackson | |
| 6,626,342 B1 * | 9/2003 | Gleason | A45F 3/08 224/633 |
| 6,889,882 B1 | 5/2005 | Leep | |
| 7,287,677 B2 * | 10/2007 | Reid | A45F 3/047 224/628 |
| 7,634,919 B2 | 12/2009 | Bernhard, Jr. et al. | |
| 7,673,777 B2 * | 3/2010 | Gleason, Jr. | A45F 3/08 224/635 |
| 7,988,024 B2 * | 8/2011 | Jankoski | A45F 3/08 224/635 |
| 8,240,531 B2 * | 8/2012 | Lam | A45F 3/04 224/631 |
| 8,348,114 B2 | 1/2013 | Gleason, Jr. | |
| 8,381,956 B2 * | 2/2013 | Gleason, Jr. | A45F 3/10 224/645 |
| 8,496,149 B1 * | 7/2013 | Sohm | A45F 3/14 224/633 |
| 8,641,056 B1 | 2/2014 | Carter | |
| 8,714,424 B2 * | 5/2014 | Oddou | A45F 3/04 224/262 |
| 8,740,028 B2 * | 6/2014 | Hairston | A45F 3/04 224/636 |
| 8,783,530 B1 | 7/2014 | Jordan | |
| 8,857,681 B2 | 10/2014 | Burnett | |
| 8,919,628 B2 * | 12/2014 | Jamlang | A45F 3/14 224/583 |
| 8,936,172 B2 | 1/2015 | Hicks | |
| 9,027,812 B2 | 5/2015 | Lester | |
| 9,113,697 B2 | 8/2015 | Brensinger et al. | |
| 9,119,460 B2 * | 9/2015 | Ables | A45F 3/047 |
| 9,181,022 B2 | 11/2015 | Armstrong | |
| 9,220,333 B2 | 12/2015 | Losos et al. | |
| 9,364,072 B2 | 6/2016 | Hairston et al. | |
| 9,498,008 B2 * | 11/2016 | Murphy | A41D 13/0007 |
| 2004/0108350 A1 * | 6/2004 | Warren | A45F 3/08 224/633 |
| 2006/0213944 A1 * | 9/2006 | Dieter | A45F 3/04 224/648 |
| 2007/0152007 A1 * | 7/2007 | Kauss | A45F 3/14 224/637 |
| 2008/0018067 A1 | 1/2008 | Small | |
| 2008/0035686 A1 * | 2/2008 | Gregory | A45F 3/10 224/262 |
| 2009/0032562 A1 | 2/2009 | Glass | |
| 2009/0108036 A1 | 4/2009 | Moore et al. | |
| 2009/0127299 A1 | 5/2009 | Jamlang | |
| 2010/0155447 A1 * | 6/2010 | Zheng | A45F 3/047 224/576 |
| 2010/0176172 A1 * | 7/2010 | Gleason, Jr. | A45F 3/08 224/635 |
| 2011/0108595 A1 | 5/2011 | Hoag | |
| 2011/0186611 A1 | 8/2011 | Eberle | |
| 2011/0198377 A1 | 8/2011 | Froidevaux et al. | |
| 2012/0006865 A1 * | 1/2012 | Su | A45F 3/06 224/153 |
| 2012/0145720 A1 | 6/2012 | Hicks | |
| 2012/0234879 A1 * | 9/2012 | Lester | A45F 3/08 224/261 |
| 2013/0283492 A1 | 10/2013 | Ernst, Jr. | |
| 2014/0027481 A1 | 1/2014 | Schultz et al. | |
| 2014/0166714 A1 | 6/2014 | Peisley et al. | |
| 2014/0209646 A1 * | 7/2014 | Hoppa | A45F 3/08 224/261 |
| 2014/0353351 A1 | 12/2014 | Armstrong | |
| 2015/0078683 A1 | 3/2015 | Hicks | |
| 2015/0157115 A1 * | 6/2015 | Smith | A45F 3/047 224/633 |
| 2016/0000212 A1 | 1/2016 | Lee | |
| 2016/0058160 A1 * | 3/2016 | Ridley | A45F 3/08 224/261 |
| 2016/0081460 A1 * | 3/2016 | Di Stasio | A45F 3/14 224/153 |

\* cited by examiner

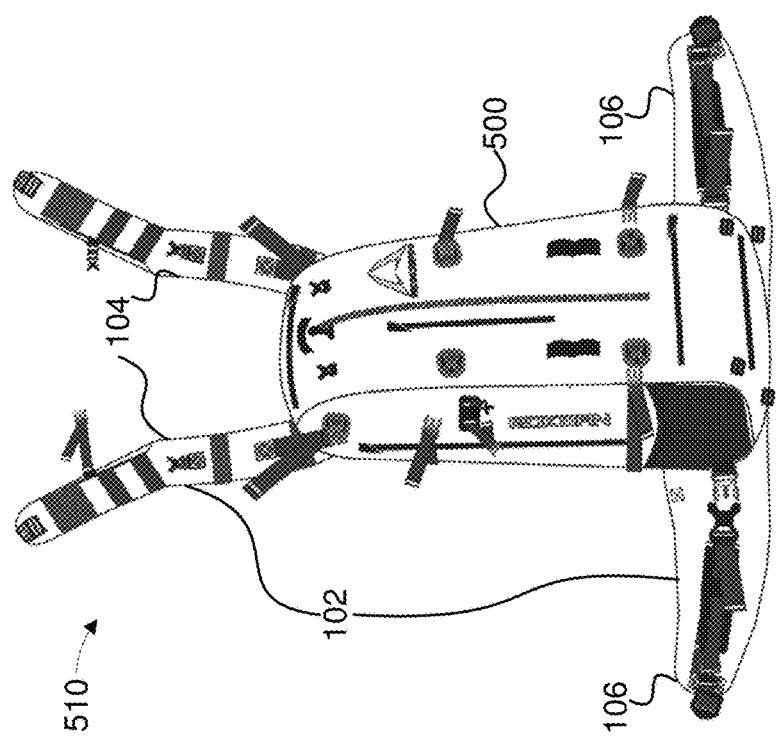
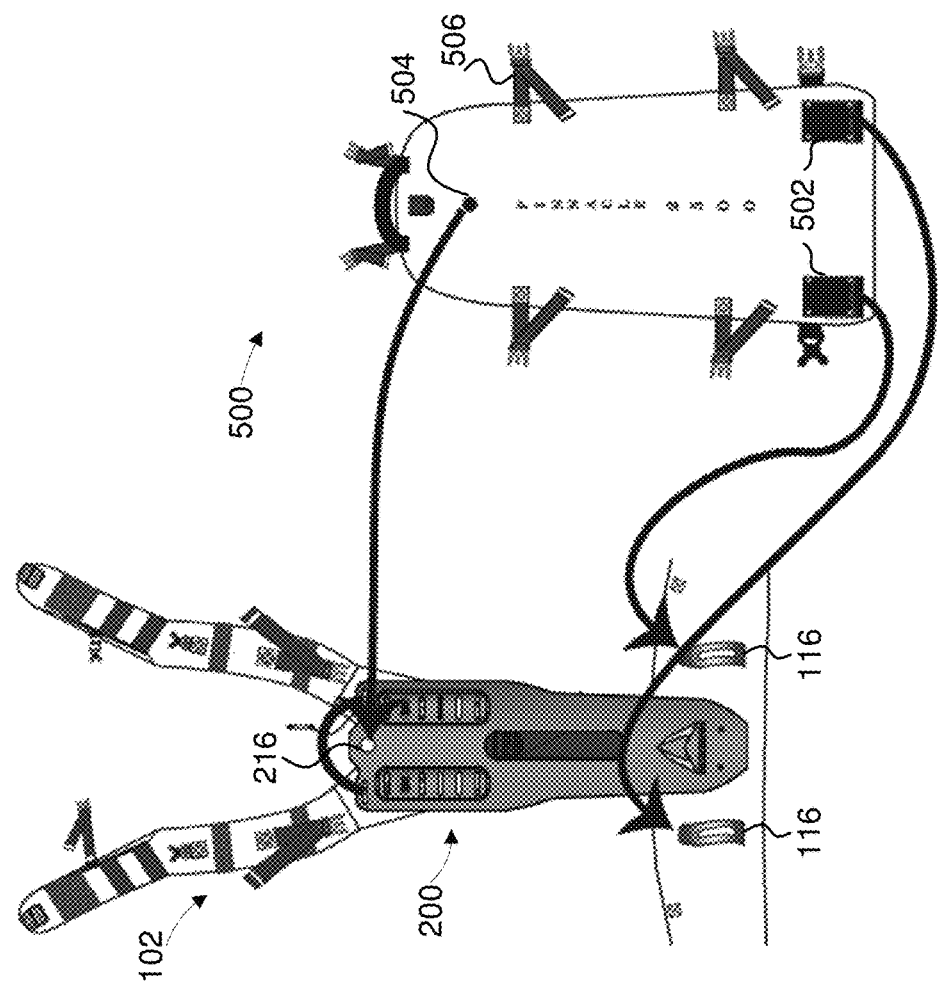
FIG. 5B
FIG. 5A

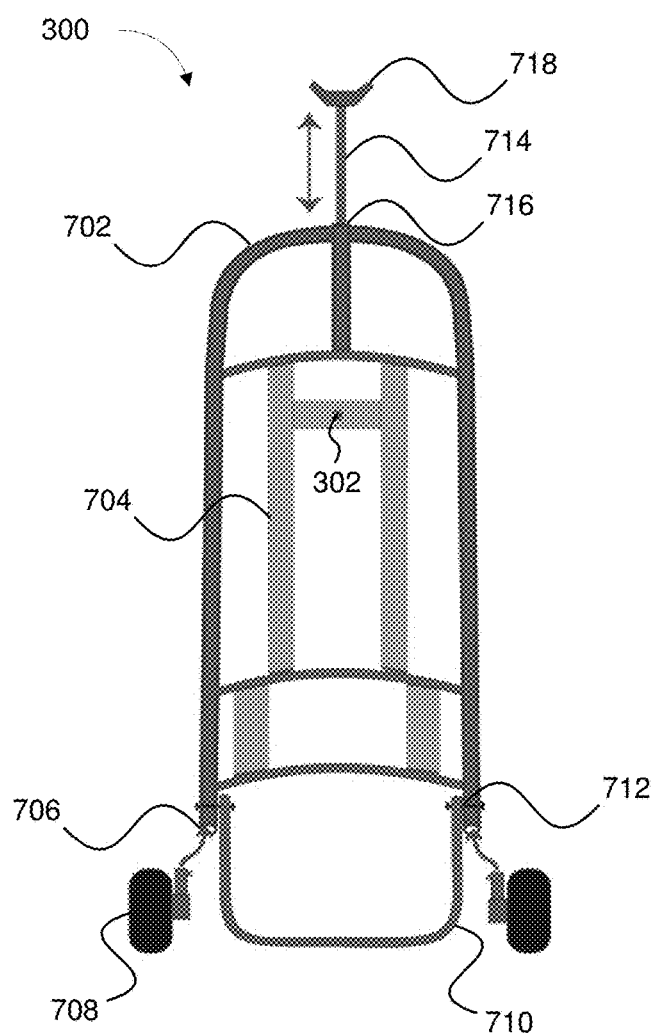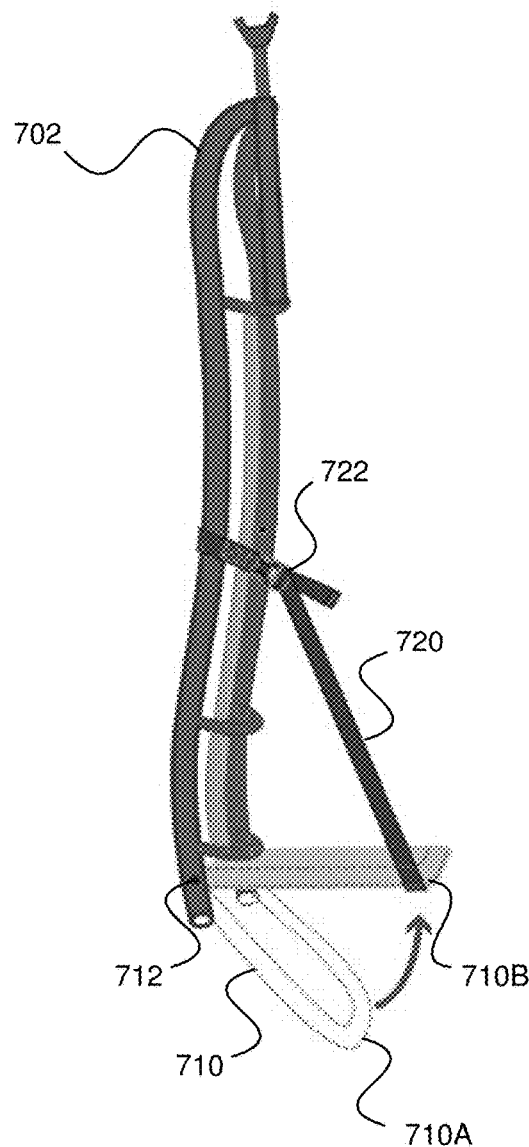
FIG. 7A
FIG. 7B

BACKPACK SYSTEM WITH INTERCHANGEABLE ELEMENTS

CROSS-REFERENCES TO RELATED APPLICATIONS

This application claims the benefit of, U.S. Provisional Patent Application No. 62/474,443 entitled "BACKPACK SYSTEM WITH INTERCHANGEABLE ELEMENTS" and filed on Mar. 21, 2017 for EVAN HOGE, which is incorporated herein by reference.

FIELD

This invention relates to a backpack system and more particularly relates to a backpack system with interchangeable elements.

BACKGROUND

Backpacks and other carrying implements are advantageous for providing capacity for cargo such as sporting or work supplies or materials. In many conventional backpack systems, the measure of the backpack is the volume capacity. For example, a daypack may fall in the range of 10-40 liters of capacity while a weekend bag may carry 35-50 liters and an extended trip bag carrying 70+ liters. Therefore, depending on the activity, different bags are better or worse suited and multiple different bags are needed for those who participate in different activities.

SUMMARY

A backpack apparatus is disclosed. The backpack apparatus includes a backpack harness, an external frame, and a backpack. The backpack harness includes a vertical support element, shoulder straps, and a hip belt. The shoulder straps and hip belt are coupled to the vertical support element. The backpack harness includes a first portion of a coupling mechanism. The external frame includes a second portion of the coupling mechanism. The external frame releasably couples to the backpack harness by coupling the first portion of the coupling mechanism to the second portion of the coupling mechanism. The external frame includes a first coupling mechanism. The backpack includes a second portion of a coupling mechanism. The backpack releasably couples to the backpack harness by coupling the first portion of the coupling mechanism on the backpack harness to the second portion of the coupling mechanism on the backpack and the backpack releasably couples to the external frame.

In another embodiment, the backpack releasably couples to the external frame by coupling the first portion of the coupling mechanism of the external frame to the second portion of the coupling mechanism of the backpack.

In one embodiment, the backpack harness includes a first portion of a coupling and the external frame includes a first portion of a coupling and the external frame comprises a second portion of a coupling and the backpack includes a second portion of a coupling. The coupling mechanism differs from the coupling. The external frame releasably couples to the backpack harness via the coupling mechanism and by releasably coupling the first portion of the coupling on the backpack harness to the second portion of the coupling on the external frame. The backpack releasably couples to the backpack harness via the coupling mechanism and by releasably coupling the first portion of the coupling on the backpack harness to the second portion of the coupling on the backpack. The backpack releasably couples to the external frame via the coupling mechanism and by releasably coupling the first portion of the coupling on the external frame to the second portion of the coupling on the backpack.

In one embodiment, each portion of a coupling of the backpack harness, the external frame, and the backpack are attached via a strap to the respective backpack harness, external frame, and backpack. In another embodiment, each coupling mechanism is located on a bottom portion of the backpack harness, the external frame, and the backpack and each coupling is located on a top portion of the backpack harness, the external frame, and the backpack. In another embodiment, the first portion of the coupling mechanism on the backpack harness is located on the hip belt and the first portion of the coupling is located at a top portion of the backpack harness.

In one embodiment, the external frame couples to the backpack harness with two coupling mechanisms and two or more couplings and the backpack couples to the external frame with two coupling mechanisms and two or more couplings and the backpack couples to the external frame with two or more couplings. In another embodiment, the coupling includes one of a pin stud and corresponding opening, a buckle, a hook and loop fastener, a snap, a clip, a double D-ring connector, and a cam-buckle connector.

In one embodiment, the opening corresponding to the pin stud comprises a grommet and the pin stud comprises a hole in an end distal to where the pin stud is attached. The hole is sized to accommodate a locking device. When the pin stud is inserted in to the grommet, the hole in the pin stud is exposed through the grommet and the locking device inserted through the hole prevents the pin stud from exiting the grommet.

In one embodiment, the first portion of each coupling mechanism includes a first end of a horizontal section coupled to a first end of a vertical section. A second end of the vertical section distal to the first end of the vertical section extends upward. A second end of the horizontal is coupled to the backpack or to the external frame. In another embodiment, the second portion of each coupling mechanism includes a downward facing recess. A first portion of a coupling mechanism couples to a second portion of the coupling mechanism by sliding the recess of the second portion of the coupling mechanism over the vertical section of the first portion of the coupling mechanism.

Another embodiment further includes an accessory. The backpack includes a first portion of a coupling and the accessory includes a second portion of the coupling and the accessory releasably couples to the backpack, to the external frame, and to the backpack harness. In another embodiment, the accessory includes one or more of a binocular case, a daypack, a fanny pack, and a pouch. In another embodiment, the first portion of the coupling mechanism of the backpack harness supports a weight of the external frame and an expected weight of the backpack.

In one embodiment, the external frame includes a horizontal section pivotably coupled to a bottom portion of a vertical section of the external frame. The horizontal section rotates between a vertical position and a horizontal position. In another embodiment, the external frame includes two wheels. The wheels are detachably coupled to a right side and to a left side of the vertical section.

In one embodiment, the external frame includes a handle coupled to the external frame via a slidable extension. The handle includes a grip portion shaped for a hand of a user to hold the handle and a notch section that accommodates a firearm resting on the notch section. The slidable extension is movable between a stowed position and an extended position.

In one embodiment, at least one of the external frame and the backpack includes a game strap. A bottom of the game strap is coupled to the at least one of the external frame and the backpack and a top of the game strap is releasably coupled to the at least one of the external frame and the backpack. The game strap includes one or more openings located between the top and the bottom of the game strap. The one or more openings are sized to accommodate a snout of a head of an animal. In another embodiment, the game strap is sized for a head, antlers, and a cape of an animal. The antlers protrude beyond the top of the game strap when the top of the game strap is releasably coupled to the at least one of the external frame and the backpack.

A backpack apparatus is also disclosed. The backpack apparatus includes a backpack harness, an external frame, and a backpack. The back harness includes a vertical support element, shoulder straps, and a hip belt. The shoulder straps and hip belt are coupled to the vertical support element. The backpack harness includes a first portion of a coupling mechanism and a first portion of a buckle. The external frame includes a second portion of the coupling mechanism and a second portion of the buckle. The external frame releasably couples to the backpack harness by coupling the first portion of the coupling mechanism to the second portion of the coupling mechanism and the first portion of the buckle to the second portion of the buckle. The external frame includes a first portion of a buckle. The backpack includes a second portion of a coupling mechanism and a second portion of a buckle. The backpack releasably couples to the backpack harness by coupling the first portion of the coupling mechanism on the backpack harness to the second portion of the coupling mechanism on the backpack and the first portion of the buckle on the backpack harness to the second portion of the buckle on the backpack. The backpack releasably couples to the external frame by coupling the first portion of the buckle of the external frame to the second portion of the buckle of the backpack. Each coupling mechanism is located on a bottom portion of the backpack harness, the external frame and the backpack and each buckle is located on a top portion of the backpack harness, the external frame, and the backpack.

In one embodiment, the first portion of each coupling mechanism includes an L-shape comprising a horizontal section and a vertical section. A first end of the horizontal section is coupled to a first end of the vertical section. A second end of the vertical section distal to the first end of the vertical section extends upward. A second end of the horizontal section is coupled to the backpack or to the external frame. The second portion of each coupling mechanism includes a downward facing recess. A first portion of a coupling mechanism couples to a second portion of the coupling mechanism by sliding the recess of the second portion of the coupling mechanism over the vertical section of the first portion of the coupling mechanism.

In one embodiment, the external frame includes a horizontal section pivotably coupled to a bottom portion of a vertical section of the external frame. The horizontal section rotates between a vertical position and a horizontal position. IN some embodiments, the external frame includes two wheels. The wheels are releasably coupled to a right side and to a left side of the vertical section.

In one embodiment, the external frame includes a handle coupled to the external frame via a slidable extension. The handle includes grip portion shaped for a hand of a user to hold the handle and a notch section that accommodates a firearm resting on the notch section. The slidable extension is movable between a stowed position and an extended position.

In one embodiment, at least one of the external frame and the backpack includes a game strap. A bottom of the game strap is coupled to the at least one of the external frame and the backpack and a top of the game strap is releasably coupled to the at least one of the external frame and the backpack. The game strap includes one or more openings located between the top and the bottom of the game strap. The one or more openings are sized to accommodate a snout of a head of an animal.

An apparatus is also disclosed. The apparatus includes an external frame, a slidable extension, and a handle. The external frame of a backpack system includes detachable wheels. The slidable extension is coupled to the external frame. The slidable extension is movable between a stowed position and an extended position. The slidable extension extends from a top of the external frame, where the detachable wheels are coupled to a bottom of the external frame. The handle is coupled to the slidable extension. The handle includes a grip portion shaped for a hand of a user to hold the handle and a notch section that accommodates a firearm resting on the notch section.

In one embodiment, the grip portion of the handle includes sides that extend away from where the handle couples to the slidable extension. The notch section is located on a top of the handle. The top of the handle distal to where the handle couples to the slidable extension.

In one embodiment, the notch section on top of the handle is oriented parallel to an axis through the sides of the handle and where the handle couples to the slidable extension. In another embodiment, the notch section includes a first notch and a second notch perpendicular to the first notch. The first notch is wider than the second notch.

In one embodiment, the external frame includes a horizontal section and a vertical section. The horizontal section is pivotably coupled to a bottom portion of the vertical section of the external frame. The horizontal section rotates between a vertical position and a horizontal position. In another embodiment, the horizontal section includes one or more supports coupled to the vertical section that limit rotation of the horizontal section to prevent the horizontal section from rotating past the horizontal position.

In one embodiment, the supports lock the horizontal section in the horizontal position. The external frame maintains the vertical section in a vertical orientation when the horizontal section is locked in the horizontal position. In another embodiment, the supports, the vertical section, and the horizontal section are sized to support an expected weight of the backpack, contents of the backpack, and attachments to the backpack. In another embodiment, the supports include a support strap connected to the vertical section of the external frame a distance from a bottom of the vertical section and to the horizontal section on an end portion of the horizontal section. The end portion distal to where the horizontal section pivotably couples to the vertical section. The support strap includes a support coupling located between the vertical section and the horizontal section. Another embodiment further includes an anchor strap connected to a portion of a coupling, buckling a portion of the support strap, and connected portion of the support coupling to the anchor strap and connected portion of a coupling maintains the horizontal section in the vertical position.

In one embodiment, the slidable extension includes a locking mechanism operable to lock the slidable extension with the handle at a height and to release the slidable extension to move to move the handle to a different height. In another embodiment, the handle is rotatable with respect to the external frame. The handle is rotatable in a plane perpendicular to the slidable extension. In another embodiment, the handle is lockable in a pulling position with respect to the external frame. The handle in the pulling position has sides extending in a direction parallel with an axis in line with a center of each detachable wheel.

Another embodiment further includes a backpack of the backpack system. The backpack releasably couples to the external frame. Another embodiment further includes a backpack harness of the backpack system. The external frame releasably couples to the backpack harness and the backpack releasably couples to the backpack harness.

In one embodiment, the external frame includes a game strap. A bottom of the game strap is coupled to the external frame and a top of the game strap is releasably coupled to the external frame. The game strap includes one or more openings located between the top and the bottom of the game strap. The one or more openings are sized to accommodate a snout of a head of an animal.

In one embodiment, the slidable extension includes a hollow portion within the external frame and an extendable portion that conforms to an interior shape of the hollow portion and slides in and out of the hollow portion. In another embodiment, the handle is releasably coupled to the slidable extension An apparatus is also described. The apparatus includes an external frame of a backpack system, a slidable extension, a locking mechanism, and a handle. The external frame of backpack system includes detachable wheels. The external frame includes a horizontal section and a vertical section. The horizontal section pivotably couples to the bottom portion of the vertical section of the external frame. The horizontal section rotates between a vertical position and a horizontal position. The horizontal section supports the vertical section of the external frame in a vertical position when the horizontal section is in the horizontal position. The slidable extension is coupled to the external frame. The slidable extension is movable between a stowed position and an extended position. The slidable extension extends from a top of the external frame, where the detachable wheels are coupled to a bottom of the external frame. The locking mechanism is operable to lock the slidable extension with the handle at a height and to release the slidable extension to move the handle to a different height. The handle is rotatably coupled to the slidable extension. The handle includes a grip portion shaped for a hand of a user to hold the handle and a notch section that accommodates a firearm resting on the notch section. The grip portion of the handle includes sides that extend away from where the handle couples to the slidable extension. The notch section is located on a top of the handle. The top of the handle is distal to where the handle couples to the slidable extension.

One embodiment further includes a backpack of the backpack system. The backpack releasably couples to the external frame. Another embodiment further includes a backpack harness of the backpack system. The external frame releasably couples to the backpack harness and the backpack releasably couples to the backpack harness.

In another embodiment, the external frame includes a game strap. A bottom of the game strap is coupled to the horizontal section of the external frame and a top of the game strap is releasably coupled to the vertical section of the external frame. The game strap includes one or more openings located between the top and the bottom of the game strap. The one or more openings are sized to accommodate a snout of a head of an animal.

An apparatus is also disclosed. The apparatus includes a backpack harness, backpack system component, and a game strap. The backpack harness includes a vertical support element, shoulder straps, and a hip belt. The shoulder straps and hip belt are coupled to the vertical support element. The backpack system component is releasably coupleable to the backpack harness and includes one of a backpack and an external frame. A bottom of the game strap is coupled to the backpack system component and a top of the game strap is coupled to the backpack system component. The game strap includes one or more openings located between the top and the bottom of the game strap. The one or more openings are sized to accommodate a snout of a head of an animal. One or more of the bottom of the game strap and the top of the game strap are releasably coupled to the backpack system component.

In one embodiment, the backpack system component includes the external frame. The external frame includes a horizontal section pivotably coupled to a bottom portion of a vertical section of the external frame. The horizontal section rotates between a vertical position and a horizontal position. The bottom of the game strap couples to an end of the horizontal section, the end distal to where the horizontal section pivotably couples to the vertical section. The top of the game strap couples to the vertical section.

In one embodiment, the game strap includes two or more openings. Each opening is of a different diameter. Each opening of the two or more openings is sized for different animal snouts. In another embodiment, the game strap releasably couples to the backpack system component using one or more couplings. The couplings are coupled to one or more of the backpack system component and the game strap via a strap. In another embodiment, coupling of the couplings that releasably couples the backpack system component to the game strap includes one of a buckle, a hook and loop fastener, a snap, a clip, a double D-ring connector, and a cam-buckle connector.

In one embodiment, the coupling between the backpack system component and the game strap includes an adjustment mechanism that allows adjustment of a distance between one or more of the top and the bottom of the game strap and the backpack system component. In another embodiment, the game strap is sized for a head, antlers, and a cape of an animal. The antlers protrude beyond the top of the game strap when the top of the game strap is releasably coupled to the backpack system component.

In one embodiment, the backpack system component includes an external frame. The external frame includes a handle coupled to the external frame via a slidable extension. The handle includes grip portion shaped for a hand of a user to hold the handle and a notch section that accommodates a firearm resting on the notch section. The slidable extension is movable between a stowed position and an extended position.

In one embodiment, the backpack system component includes a pouch sized to accommodate the game strap placed in the pouch. One of the top and the bottom of the game strap couples to the backpack system component at the pouch allowing the game strap to be placed in the pouch. In another embodiment, the game strap additionally releasably couples to the backpack system component at a location between the top and the bottom of the game strap. In one embodiment, the pouch includes a closure element to close the pouch when the game strap is place in the pouch. In another embodiment, the game strap is coupled to an interior portion of the pouch.

In one embodiment, the bottom of the game strap couples to the backpack system component at two locations. The top of the game strap couples to the backpack system component at two locations. In another embodiment, the game strap includes a flexible material having a flexibility sufficient to wrap around one or more of an animal head and an animal cape.

In one embodiment, the backpack system includes an external frame, a backpack harness, and a backpack. The backpack harness releasably couples to the external frame and to the backpack. The backpack also releasably couples to the external frame.

An apparatus is also disclosed. The apparatus includes an external frame of a backpack system and a game strap. The external frame of the backpack system includes a horizontal section and a vertical section. The horizontal section is pivotably coupled to the bottom portion of the vertical section of the external frame. The horizontal section rotates between a vertical position and a horizontal position. The horizontal section supports the vertical section of the external frame in a vertical position when the horizontal section is in the horizontal position. A bottom of the game strap is coupled to an end of the horizontal section of the external frame. The end is distal to where the horizontal section pivotably couples to the vertical section. A top of the game strap is coupled to the vertical section of the external frame. The game strap includes one or more openings located between the top and the bottom of the game strap. The one or more openings are sized to accommodate a snout of a head of an animal. One or more of the bottom of the game strap and the top of the game strap are releasably coupled to the external frame.

In one embodiment, the external frame includes a handle coupled to the external frame via a slidable extension. The handle includes a grip portion shaped for a hand of a user to hold the handle and a notch section that accommodates a firearm resting on the notch section. The slidable extension is movable between a stowed position and an extended position.

In one embodiment, the backpack system includes a backpack and a backpack harness. The external frame releasably couples to the backpack harness and the backpack releasably couples to the external frame and to the backpack harness when not coupled to the external frame.

In one embodiment, the game strap is stowable within a pouch of the external frame. In another embodiment, the bottom of the game strap is coupled to a portion of the pouch of the external frame. In one embodiment, the pouch includes a closure element to close the pouch when the game strap is stowed. In another embodiment, the game strap additionally releasably couples to the external frame at a location between the top and the bottom of the game strap. In another embodiment, the game strap includes a flexible material with a flexibility sufficient to wrap around one or more of an animal head and an animal cape.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5A depicts an exploded view of a backpack coupled to the backpack harness and vertical support element in accordance with one embodiment of the present invention;

FIG. 5B depicts a perspective view of a backpack arrangement in accordance with one embodiment of the present invention;

FIG. 7A depicts a schematic view of a frame in accordance with another embodiment of the present invention;

FIG. 7B depicts a side view of the frame of FIG. 7A in accordance with another embodiment of the present invention;

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of systems and apparatuses to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
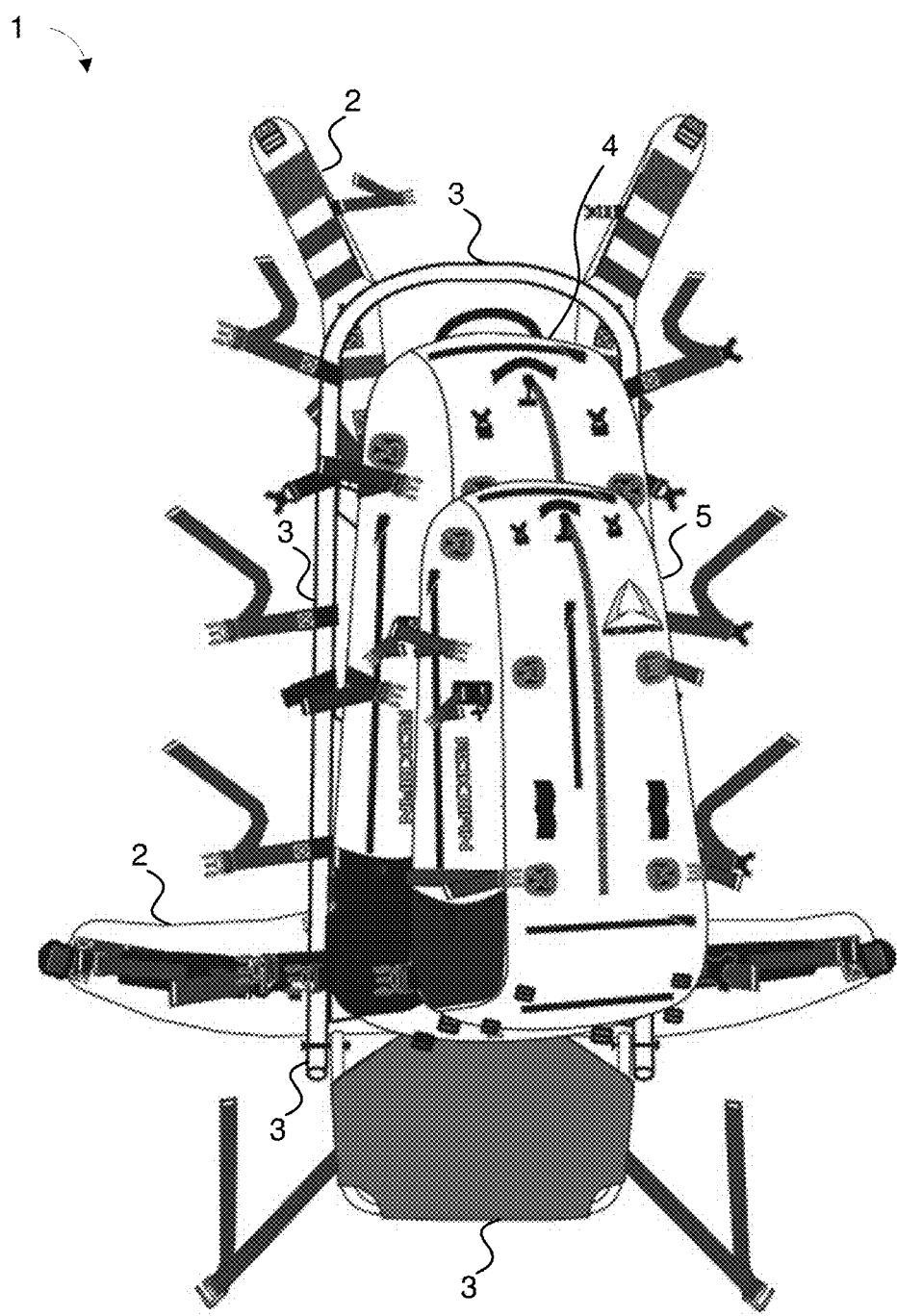
FIG. 1 depicts a perspective view of a backpack apparatus in accordance with one embodiment of the present invention.

FIG. 1 depicts a perspective view of a backpack apparatus 1 in accordance with one embodiment of the present invention. In the illustrated embodiment, the backpack apparatus 1 is a modular system. In some embodiments, one or more components of the backpack apparatus 1 are releasably coupled to one or more other components of the backpack apparatus 1. In some embodiment, the backpack apparatus 1 provides a flexible system that is configurable to suit a wide range of activities having a wide range of demands. For example, the backpack apparatus 1 may be configured with a relatively large capacity to facilitate carriage of a relatively large number of items for one activity having a corresponding demand while the backpack apparatus 1 may be easily reconfigured to another configuration corresponding with a demand of another activity. In this manner, the backpack apparatus 1 may take many different forms or configurations depending on the demands of the current activity. While some specific examples are illustrated in the figures and described in some detail below, many configurations are contemplated.

In the illustrated embodiment of FIG. 1, the backpack apparatus 1 includes a backpack harness 2, a frame 3, a first backpack 4, and a second backpack 5. In some embodiments, the backpack apparatus 1 includes additional components such as fanny packs, binocular packs, and other accessories in this and other configurations.

In the illustrated embodiment, the backpack harness 2 is releasably coupled to the frame 3. In some embodiments, the backpack harness 2 is capable of supporting the weight of the frame 3 and expected weight carried by the frame 3 which may include the remaining components of the backpack apparatus 1 and corresponding load weights. The first backpack 4 is releasably coupled to the frame 3 and the second backpack 5 is releasably coupled to the first backpack 4. The illustrated embodiment depicts a single configuration of many possible configurations that may use some or all of the illustrated components and other components.

Some embodiments of the backpack apparatus 1 provide a staged system. For example, the backpack apparatus 1 may be packed in the illustrated form to carry the supplies needed to establish a base camp. Once at base camp, the backpack apparatus 1 may be reconfigured to facilitate a day trip away from and back to the base camp by easily detaching the various components and coupling the second backpack 5 to the backpack harness 2, leaving the frame 3, and the first backpack 4 at the base camp. In another example, the frame 3 may be coupled to the backpack harness 2 to provide a carrying frame to retrieve an animal taken during a hunt or carry firewood or some other material or equipment. In this example, the remaining components may be left at the base camp.

In another example, accessories such as a fanny pack, binocular pack, and other accessories described in more detail below may be coupled to the backpack harness 2 to facilitate game scouting or some other activity requiring relatively less carrying capacity and weight/bulk. Other configurations and arrangements are also contemplated with further examples described in greater detail below.

Figure 2A:
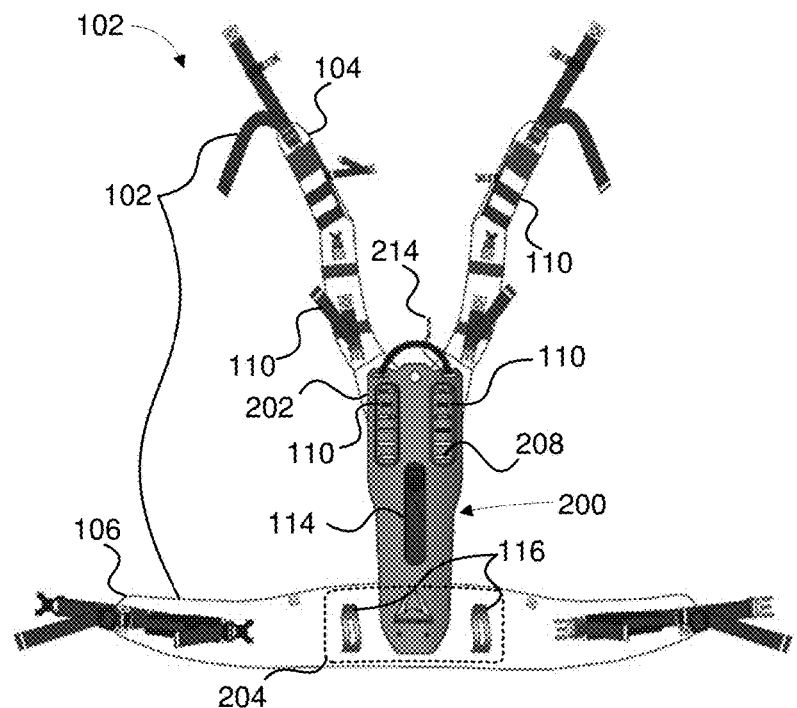
FIG. 2A depicts a schematic view of a backpack harness with a vertical support element in accordance with one embodiment of the present invention.

FIG. 2A depicts a schematic view of a backpack harness 102 with a vertical support element 200 in accordance with one embodiment of the present invention. In some embodiments, the backpack harness 102 is similar to the backpack harness 2 of FIG. 1. In the illustrated embodiment, the backpack harness 102 includes a pair of shoulder straps 104 and a hip belt 106. The shoulder straps 104 may include attachment elements 110 to facilitate connection of another component of the backpack apparatus 1 of FIG. 1. The attachment elements 110 may include loops, straps, buckles, clips, latches, snaps, hook-and-loop, etc. In some embodiments, the attachment elements 110 facilitate the attachment of accessories compatible with the backpack harness 102.

In the illustrated embodiment, the shoulder straps 104 is coupled to the vertical support element 200 which also includes a handle 112. The handle 112 provides a structure for ease of handling or hanging the backpack harness 102. The handle 112 may include other attachment elements 110 incorporated with the handle 112 or a material of the handle 112. For example, the handle 112 may include an adjustment mechanism such as an anchor, a trimmer, or a tri-glide to receive, secure, and adjust a strap or other component. In other embodiments, fewer or more components are incorporated into the handle 112 to provide less or more functionality.

In some embodiments, the shoulder straps 104 are connected to the hip belt 106 via a vertical support strap 114. In some embodiments, the vertical support strap 114 is flexible in one or more directions. In other embodiments, the vertical support strap 114 is rigid in one or more directions. In further embodiments, the vertical support strap 114 is semi-rigid to allow a degree of flexibility in one or more directions.

In the illustrated embodiment, the vertical support strap 114 is adjustable to vary the location of the shoulder straps 104 relative to the hip belt 106. In other embodiments, the vertical support strap 114 is fixed in length and does not allow adjustment of the location of the shoulder straps 104 relative to the hip belt 106.

In the illustrated embodiment of FIG. 2A, the vertical support strap 114 includes a flexible strap adjustably secured to the shoulder straps 104 and the hip belt 106. The vertical support strap 114 may be made of nylon webbing, canvas, leather, or other materials suitable to connect the shoulder straps 104 and the hip belt 106. In the illustrated embodiment, the vertical support strap 114 is sewn to the shoulder straps 104 and to the hip belt 106. In other embodiments, the vertical support strap 114 is removably or permanently attached to one or both of the shoulder straps 104 and the hip belt 106 in other ways, including but not limited to snaps, hook-and-loop, grommets, rivets, welds, staking, adhesion, clips, hooks, loops, toggles, sliders, zippers, and ties.

The illustrated embodiment of the backpack harness 102 also includes a first portion of a coupling mechanism 116. In the illustrated embodiment, the first portion of the coupling mechanism 116 includes a structure attached to a bottom portion of the backpack harness 102 corresponding, in the illustrated embodiment, to the hip belt 106. In some embodiments, the first portion of the coupling mechanism 116 includes a hook, attached in cantilever or L-shape to the hip belt 106, having a protrusion extending outward from the hip belt 106 and a vertical portion pointing generally upward to form an approximately vertical rigid structure. In other words, embodiments of the first portion of the coupling mechanism 116 include a substantially horizontal section coupled to a vertical section. In some embodiments, the horizontal section is coupled to the vertical section at a first end of the horizontal section with the second end of the horizontal section coupled to the backpack harness 102. The vertical section of the first portion of the coupling mechanism 116 is coupled to the horizontal section at a first end of the vertical section with the second end of the vertical section extending vertically upward. In other embodiments, the first portion of the coupling mechanism 116 includes other non-hook type structures.

In the illustrated embodiment of FIG. 2, the backpack harness 102 is shown with two first portions of the coupling mechanism 116. In other embodiments, one or more than two of the first portion of the coupling mechanism 116 are included on the backpack harness 102. In some embodiments, the first portion of the coupling mechanism 116 is secured to the hip belt 106 or another part of the backpack harness 102 using rivets. In other embodiments, the first portion of the coupling mechanism 116 is secured to the backpack harness 102 by adhesive, stitching, welds, bonding, or other attachment means.

In the illustrated embodiment, the first portions of the coupling mechanism 116 are coupled to the hip belt 106. In other embodiments, one or more of the first portions of the coupling mechanism 116 are coupled to the shoulder straps 104. Embodiments of the first coupling mechanism 116 interface with a second portion of the coupling mechanism disposed on a component compatible with the backpack harness 102 to secure the component relative to the backpack harness 102. Examples of potentially compatible components are described herein.

The shoulder straps 104 and hip belt 106 are coupled to the vertical support element 200. In the illustrated embodiment, the vertical support element 200 is coupled to the backpack harness 102 at multiple locations. In some embodiments, the main body 202 of the vertical support element 200 is coupled to the shoulder strap portion 104 of the backpack harness 102 by coupling the attachment elements 110 of the backpack harness 102 to the corresponding attachment points 208 of the vertical support element 200.

In the illustrated embodiment, the lower body 204 of the vertical support element 200 is coupled to the hip belt 106 of the backpack harness 102. In some embodiments, the lower body 204 of the vertical support element 200 is removably coupled to the hip belt 106 of the backpack harness 102. In other embodiments, the lower body 204 of the vertical support element 200 is permanently coupled to the hip belt 106 of the backpack harness 102. In some embodiments, the lower body 204 of the vertical support element 200 is disposed within a structure of the hip belt 106.

In some embodiments, the vertical support element 200 provides rigid or semi-flexible support to the backpack harness 102. In other embodiments, the vertical support element 200 provides one or more structures for coupling components to the backpack harness 102. For example, the grommet or quick-release device 216 of FIG. 2B may facilitate attachment of a backpack, frame, or other component to the backpack harness 102.

In one embodiment, the components of the vertical support element 200 provide a quick-change ability. In one example, a user simply pulls out a locking device 214 to disengage a component of the quick-release device 216, and lifts one or more backpack components, such as a frame or pack, up to uncouple any of the one or more components from the vertical support element 200. In some embodiments, to couple a component to the vertical support element 200, the user aligns a second portion of a coupling mechanism of the component to be added with the first portion of the coupling mechanism 116 of the backpack harness 102 and pulls up on the handle 112 of the backpack harness 102 and/or the handle 212 of the vertical support element 200 until the quick-release device 216 engages with a corresponding portion of the component being added.

Figure 2B:
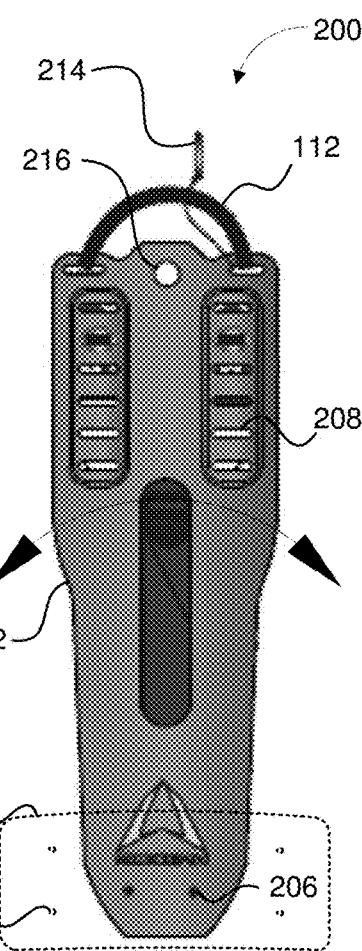
FIG. 2B depicts a schematic view of another embodiment of a vertical support element in accordance with the present invention.

FIG. 2B depicts a schematic view of another embodiment of a vertical support element 202 in accordance with the present invention. In the illustrated embodiment, the vertical support element 200 includes main body 202 and a lower body 204. In some embodiments, the main body 202 is coupled to the lower body 204 via one or more connections 206. Some example of connections that may be used includes grommets, posts, bolts, nuts, washers, or other connections. In some embodiments, the main body 202 is permanently or removably coupled to the lower body 204.

In some embodiments, some or all of the vertical support element 200 includes a composite material such as carbon fiber or fiberglass. In other embodiments, some or all of the vertical support element 200 includes a metal such as aluminum or titanium. Other embodiments include other materials or combination of materials.

In some embodiments, the main body 202 corresponds to the shoulder strap portion 104 of the backpack harness 102 of FIG. 2A and the lower body 204 corresponds to the hip belt 106 of the backpack harness 102 of FIG. 2A. In the illustrated embodiment, the main body 202 includes attachment points 208 to facilitate attachment of shoulder straps 104 or other component to the vertical support element 200. Similarly, the illustrated embodiment of the lower body 204 includes hip belt attachment points 210 to facilitate permanent or removable attachment of the lower body 204 to a hip belt 106 or other component.

In the illustrated embodiment, the main body 202 of the vertical support element 200 also includes a handle 212 to provide access to a grip point for lifting the vertical support element 200, particularly when coupled with other components in a backpack apparatus. Some embodiments of the main body 202 also include a locking device 214 associated with a grommet or quick-release device 216. In some embodiments, the quick-release device 216 is a grommet or hole in the vertical support element 200. In some embodiments, the quick-release device 216 comprises a magnet, a clip, a buckle, or other mechanism to interface with a corresponding structure that couples to the quick-release device 216. The quick-release device 216 may correspond to one or more components of a backpack apparatus including but not limited to a frame, backpack, or a backpack harness 102. In the illustrated embodiment, the quick-release device 126 is attached to the vertical support element 200 to correspond to an upper portion of the backpack harness 102 near the shoulder straps 104.

Figure 3:
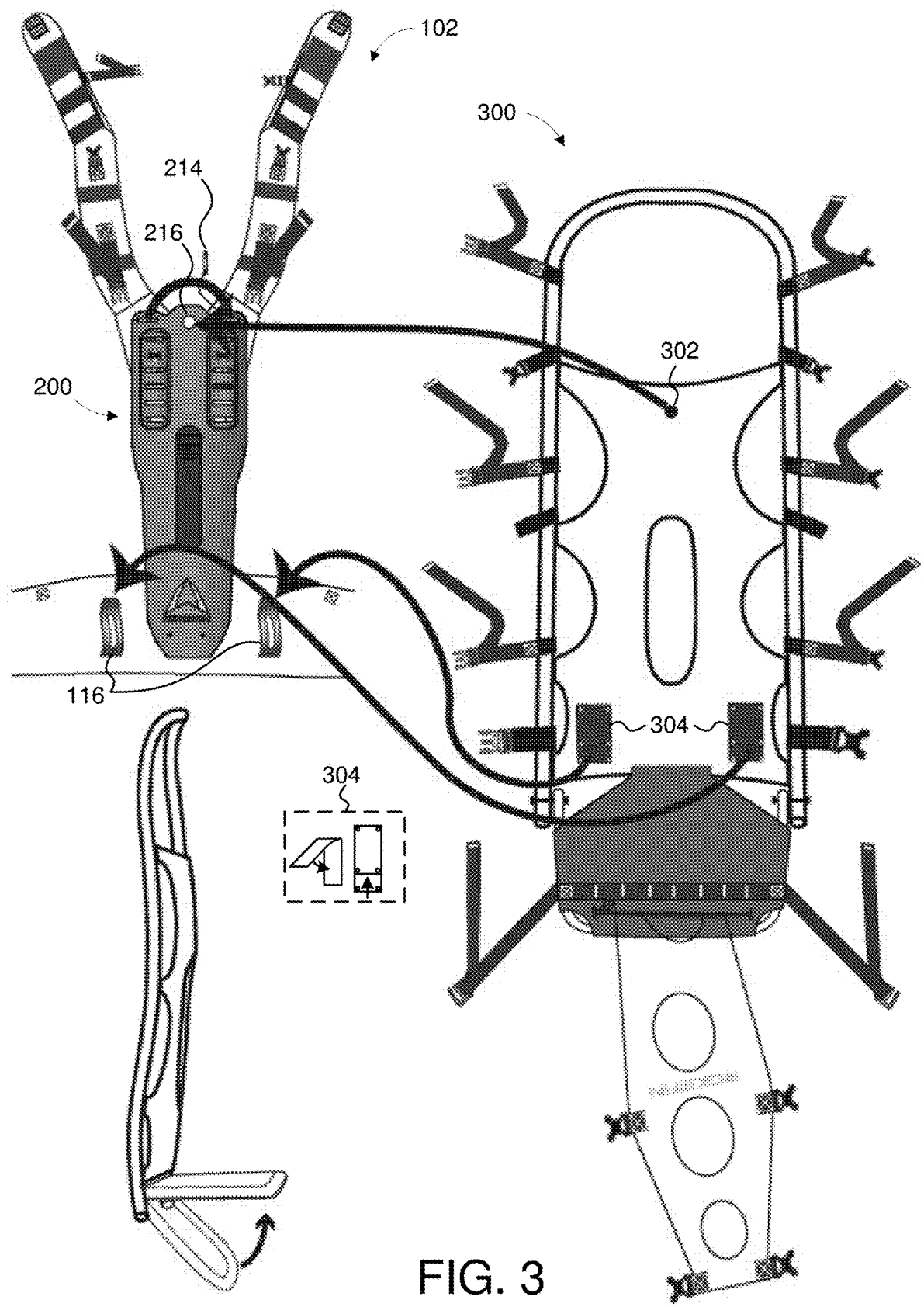
FIG. 3 depicts exploded and schematic views of a frame coupled to a backpack harness with a vertical support element in accordance with one embodiment of the present invention.

FIG. 3 depicts exploded and schematic views of a frame 300 coupled to a backpack harness 102 with a vertical support element 200 in accordance with one embodiment of the present invention. In the illustrated embodiment, the frame 300 is an external frame that couples to the backpack harness 102 by coupling the first portions of the coupling mechanism 116 on the backpack harness 102 to the second portions of the coupling mechanism 304 of the frame 300. In other embodiments, the frame 300 is an internal frame capable of forming a portion of a backpack or other component. In the illustrated embodiment, the second portions of the coupling mechanism 304 include an envelope structure which receives the hook-like structure of the first portion of the coupling mechanism 116. In some embodiments, the envelope structure of the second portion of the coupling mechanism 304 includes a recess that is downward facing to receive a corresponding vertical or upward pointing portion of a corresponding first portion of the coupling mechanism. In other embodiments, the second portion of the coupling mechanism 304 may be upward facing to receive a downward pointed first portion of the coupling mechanism.

Further, the frame 300 couples to the vertical support element 200 of the backpack harness 102 by coupling a quick connection 302 of the frame 300 to the quick-release device 216 of the vertical support element 200. In some embodiments, the quick connection 302 includes a pin stud having a hole in an end of the pin stud distal to where the pin stud is attached to the frame 300. The hole in the pin stud may be sized to accommodate the locking device 214. The hole in the pin stud may be exposed after insertion of the pin stud through the hole or quick-release device 216 and the locking device 214 may be inserted through the hole in the pin stud to prevent the pin stud from exiting the quick-release device 216 or corresponding opening. In the coupled form, the frame 300 on the backpack harness 102 and vertical support element 200 forms a frame pack 306. Embodiments of the frame 300 are described in greater detail below.

Figure 4:
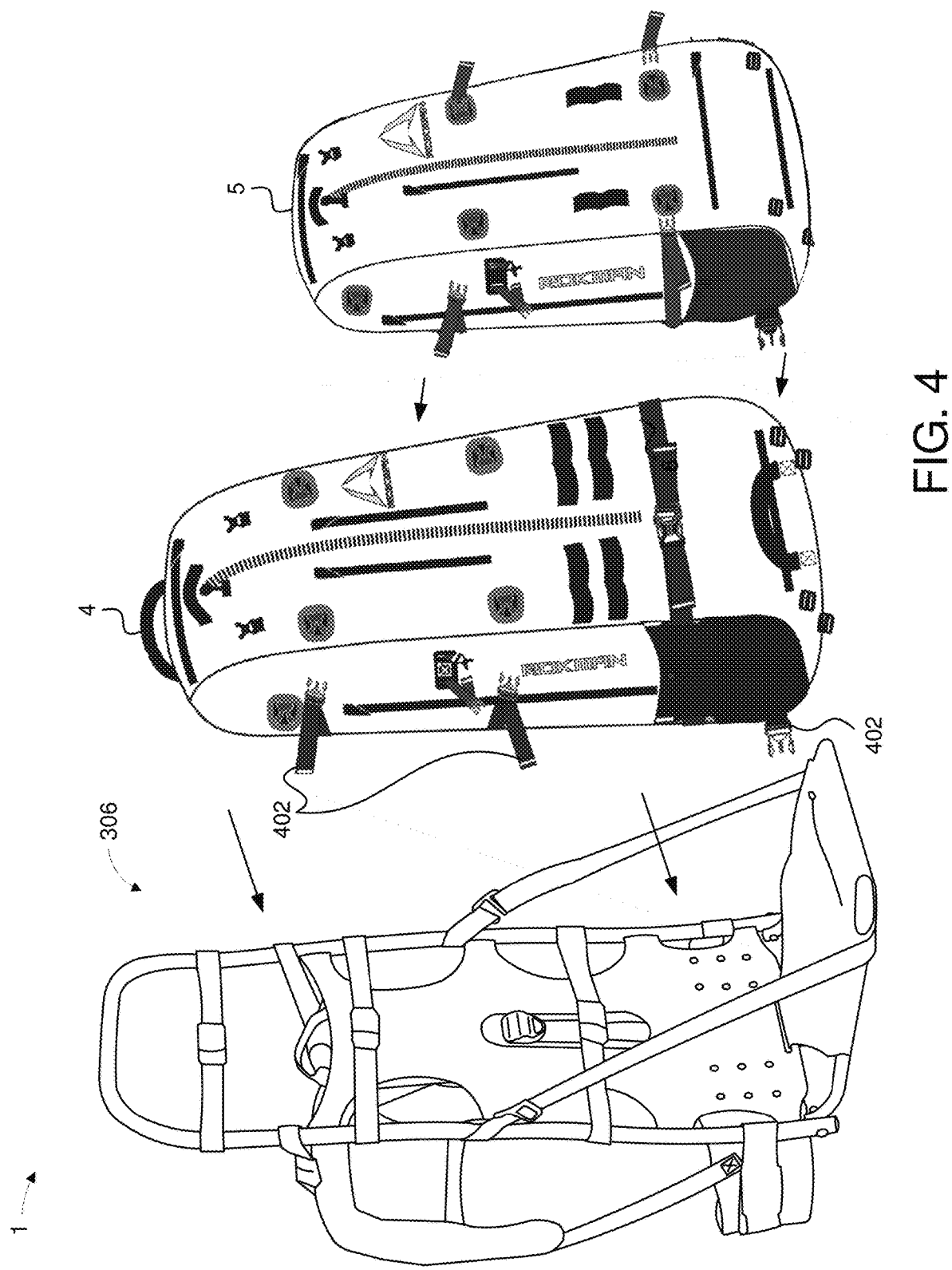
FIG. 4 depicts an exploded view of the backpack apparatus of FIG. 1 in accordance with one embodiment of the present invention.

FIG. 4 depicts an exploded view of the backpack apparatus 1 of FIG. 1 in accordance with one embodiment of the present invention. In the illustrated embodiment, the frame pack 306 receives the first backpack 4 onto the frame via straps 402 or using portions of the coupling mechanism similar to the connection between the frame and the backpack harness 102 and vertical support element 200 as described in FIG. 3. In the illustrated embodiment, the second backpack 5 attaches to the first backpack 4. In some embodiments, one or more of the second backpack 5 and other accessories attach to the frame pack 306 separately from the first backpack 4. Other arrangements are also contemplated.

FIG. 5A depicts an exploded view of a backpack 500 coupled to the backpack harness 102 and vertical support element 200 in accordance with one embodiment of the present invention. The backpack 500 of the illustrated embodiment may be similar to the second backpack 5 of FIG. 4. In the illustrated embodiment, the backpack 500 couples to the backpack harness 102 and the vertical support element 200 by coupling the second portions of a coupling mechanism 502 of the backpack 500 to the first portions of the coupling mechanism 116. In some embodiments, the backpack 500 is further coupled to the backpack harness 102 and the vertical support element 200 by engaging a quick connection 504 of the backpack 500 with the quick-release device 216 of the vertical support element 200.

In this manner, the frame 300 of FIG. 300 may be omitted. This provides a separate configuration from those mentioned above which may be better suited to the demands of a particular activity or range of activities.

FIG. 5B depicts a perspective view of a backpack arrangement 510 in accordance with one embodiment of the present invention. In the illustrated embodiment, the exploded view of FIG. 5A is consolidated to depict the components of the backpack arrangement 510 in relative arrangement. In the illustrated embodiment, the backpack 500 is secured relative to the shoulder straps 104 and the hip belt 106 of the backpack harness 102. In some embodiments, the backpack arrangement 510 provides the operation of a conventional backpack with the added functionality of modularity and reconfiguration to take separate forms without the need to have additional conventional systems on hand.

Figure 6A:
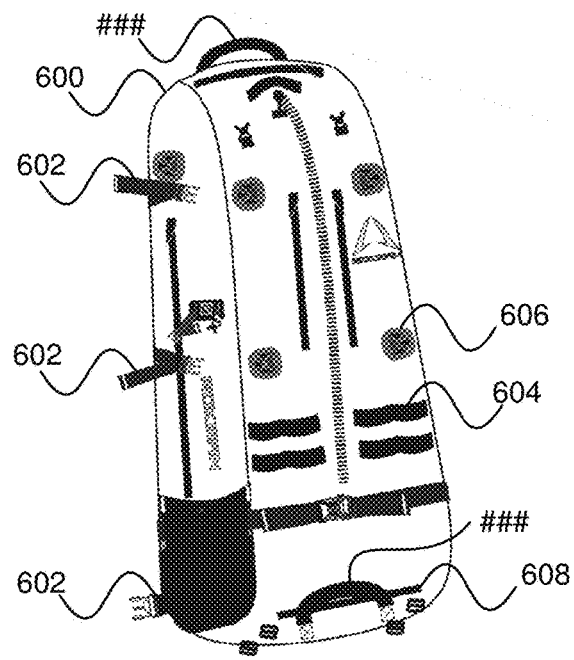
FIG. 6A depicts a perspective view of a backpack in accordance with one embodiment of the present invention.

FIG. 6A depicts a perspective view of a backpack 600 in accordance with one embodiment of the present invention. In the illustrated embodiment, the backpack 600 includes a plurality of attachment elements. In the illustrated embodiment, the attachment elements include coupling elements 602 in the form of straps, loops 604, and connections 606. The coupling elements 602 (straps) may include adjustment structures such as sliders, tri-gliders, friction locks, etc. The coupling elements 602 (straps) may also include buckles or other connection structures.

The loops 604 may include straps sewn in a segmented fashion to form loops on the backpack 600. The loops 604 may facilitate connection of various accessories or components. The connections 606 may include buckles or other structures, areas, or regions of the backpack 400 to which one or both portions (first portion or second portion) of a coupling (as described above) are, or can be, attached. In some embodiments, one or more of the coupling elements 602 (straps), loops 604, and connections 606 are removable from the backpack 600. In other embodiments, some or all of the coupling elements 602 (straps), loops 604, and connections 606 are permanently attached to the backpack 600. In some embodiments, the backpack 600 is modular and includes portion of the backpack 600 that may be removed or added to make the backpack smaller or larger, increase or decrease storage capacity of the backpack 600, or produce other results.

In the illustrated embodiment, the backpack includes handles 601. The backpack 600 may include one or more handles 601 disposed at different locations on the backpack 600 to facilitate handholds or attachment of components to the backpack 600.

In the illustrated embodiment of FIG. 6A, the backpack 600 also includes a pouch 608. The pouch 608 facilitates stowing of a game strap 612 as described in greater detail below.

Figure 6B:
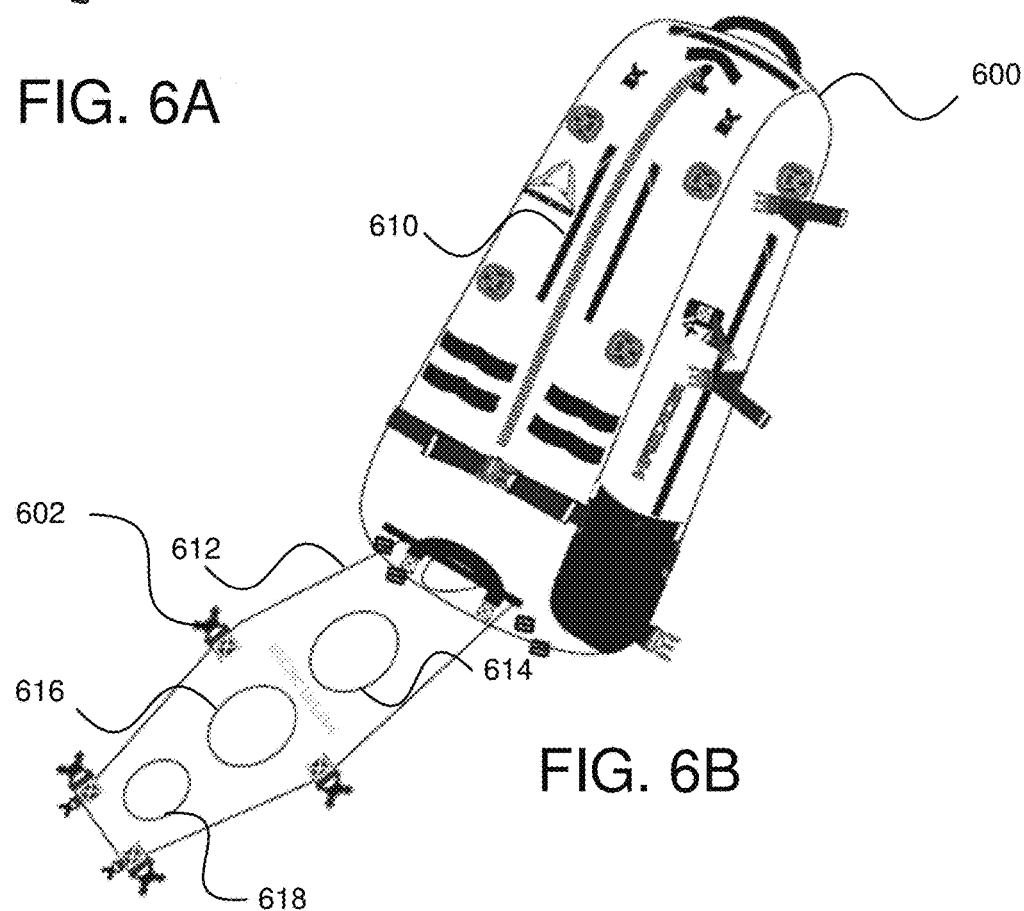
FIG. 6B depicts a perspective view of a backpack with a game strap in accordance with another embodiment of the present invention.

FIG. 6B depicts a perspective view of a backpack 600 with a game strap 612 in accordance with another embodiment of the present invention. In the illustrated embodiment, the backpack 600 includes the game strap 612 attached to a lower portion of the backpack 600. In some embodiments, the game strap 612 is coupled to the backpack 600 at two or more locations on the backpack 600 at both the top and bottom of the game strap 612.

In some embodiments, the game strap 612 is incorporated with or includes a pocket 610 of the backpack 600. In some embodiments, the pocket 610 allows for additional storage organization. In some embodiments, the game strap 612 is permanently fixed to another component. In other embodiments, the game strap 612 is releasably coupled to another component.

In some embodiments, the game strap 612 is a flexible material. In the illustrated embodiment, the game strap 612 includes a plurality of coupling elements 602. In some embodiments, the coupling element 602 include one or more one of a buckle, a hook and loop fastener, a snap, a clip, a double D-ring connector, and a cam-buckle connector. Other embodiments include other types of coupling elements 602. In some embodiments, the coupling element 602 interface with corresponding coupling elements of the backpack 600 to couple the game strap 612 to the backpack 600 at a point between a top and bottom of the game strap 612. In the illustrated embodiment, the game strap 612 pivots near the backpack 600 and rotates around to a closed position in which the game strap 612 lays against the pouch 610 and backpack 600 in a position inverted from the open configuration shown in FIG. 5B.

In the illustrated embodiment, the game strap 612 includes a series of openings 614, 616, and 618 to accommodate an object to be secured to the backpack 600. In some embodiments, the object to be secured by the game strap 612 includes an animal or part of an animal. In some embodiments, the openings 614, 616, and 618 provide location at which a snout or other feature of the animal may protrude to facilitate securing the animal or part of the animal to the backpack 600.

In the illustrated embodiment, the openings 614, 616, and 618 have different sizes or diameters. For example, the first opening 614 has a large diameter, the second opening 616 has a medium diameter, and the third opening 618 has a small diameter. In other embodiments, the openings 614, 616, and 618 are arranged in different orders. In some embodiments, the openings 614, 616, and 618 has the same or similar diameters. In the illustrated embodiment, the openings 614, 616, and 618 are circular in geometry. In other embodiments, the openings 614, 616, and 618 have non-circular geometries. In some embodiments, the game strap 612 includes reinforcement around one or more of the openings 614, 616, and 618 to prevent tearing or provide other functions such as grip or traction.

In some embodiments, the multiple openings 614, 616, and 618 facilitate multiple load carrying options and flexibility. For example, the size, shape, arrangement, and orientation of the load to be carried may be accommodated by engaging the load with one or more of the multiple openings 614, 616, and 618. For example, the game strap 612 may be used to carry a rifle, bow, or other object that may need to be transported and each of these items or combination of these items may be best accommodated by a specific opening of the openings 614, 616, and 618 or by a combination of the openings 614, 616, and 618.

In some embodiments, the game strap 612 includes a bright or brilliant color for visibility and safety. In some embodiments, the game strap 612 includes one or more reflective elements. Other functionality may be included in the game strap 612.

FIG. 7A depicts a schematic view of a frame 300 in accordance with another embodiment of the present invention. In some embodiments, the frame 300 is a component compatible with the backpack described above. For example, the frame may attach to the backpack harness 102 of FIG. 2 or the frame 300 may receive and support the backpack 400 of FIGS. 4A-B. Other arrangements are also contemplated and described in greater detail below.

In the illustrated embodiment, the frame 300 includes a vertical section which includes outer frame elements 702 and inner frame elements 704. In some embodiments, each of the outer and inner frame element 702 and 704 are rigid. In other embodiments, the outer frame elements 702 are rigid and the inner frame element 704 are flexible. In some embodiments, the inner frame element 704 includes the quick connection 302 as described above. In the illustrated embodiment, the frame 300 includes an adapter 706 to receive an accessory. In some embodiments, the adapter 706 receives a wheel assembly 708. In some embodiments, the wheel assembly 708 includes a detachable wheel that can be attached to and removed from the frame 300 to assist in moving the frame 300 along the ground or other surface.

The illustrated embodiment also includes a horizontal section 710. In some embodiments, the horizontal section 710 is pivotably connected to the frame 300 at a pivot point 712. The horizontal section 710 rotates about the pivot point 712 from a substantially vertical position, illustrated in FIG. 7B at 710A, to a horizontal position 710B.

In some embodiments, the frame 300 also includes a slidable extension 714 that is movable between a stowed position within a receiver 716 to an extended position, as illustrated in FIG. 7A. In some embodiments, the slidable extension 714 includes a handle 718. The handle 718 may include a grip portion to accommodate a user's hand and a notch section to support a firearm in a shooting position. In some embodiments, the slidable extension 714 includes a hollow portion within the frame 300 into which an extendable portion that conforms to and slides in and out of an interior shape of the hollow portion.

In some embodiments, the notch section on the handle 718 is perpendicular to an axis of ration of the wheel assemble 708 and located on a top side of the handle opposite or distal the portion of the handle 718 that couples to the slidable extension 714. In some embodiments, the notch section is parallel to an axis running through the sides of the handle and through the point where the handle intersects the slidable extension 714. In some embodiments, the handle 718 includes a first notch section and a second notch section at a top of the handle 718 with the first notch section perpendicular to the second notch section and one section being wider than the other. Other embodiments include other geometries and arrangements. In some embodiments, the handle 718 is rotatable around an axis of the slidable extension 714.

In some embodiments, the slidable extension 714 includes a locking structure to facilitate locking of the slidable extension 714 in a fixed position. In some embodiments, the slidable extension 714 is lockable in a plurality of positions. In some embodiments, the plurality of positions is preset having certain heights relative to the receiver 716.

FIG. 7B depicts a side view of the frame 300 of FIG. 7A in accordance with another embodiment of the present invention. In the illustrated embodiment, the frame 300 includes the horizontal section 710 in the vertical position 710A and the horizontal position 710B. The illustrated embodiment also includes a support including a support strap 720. In some embodiments, the support strap 720 is connected to the horizontal section 710 and the outer frame element 702 of the vertical section of the frame 300. In the illustrated embodiment, the support strap 720 is connected to the frame 300 at some distance from the pivot point 712 near a bottom portion of the frame 300. The support strap 720 is also coupled to the horizontal section 710 near an end of the horizontal section distal from the pivot point 712. In the illustrated embodiment, the support strap 720 includes a support coupling 722 between the ends of the support strap 720.

In some embodiments, the frame 300 also includes an anchor strap to connect to the support strap 720 to maintain the horizontal section 710 in the vertical position 710A. Other straps or structures may be included to secure the horizontal section 710 at other positions and orientations relative to the frame 300.

Figure 7C:
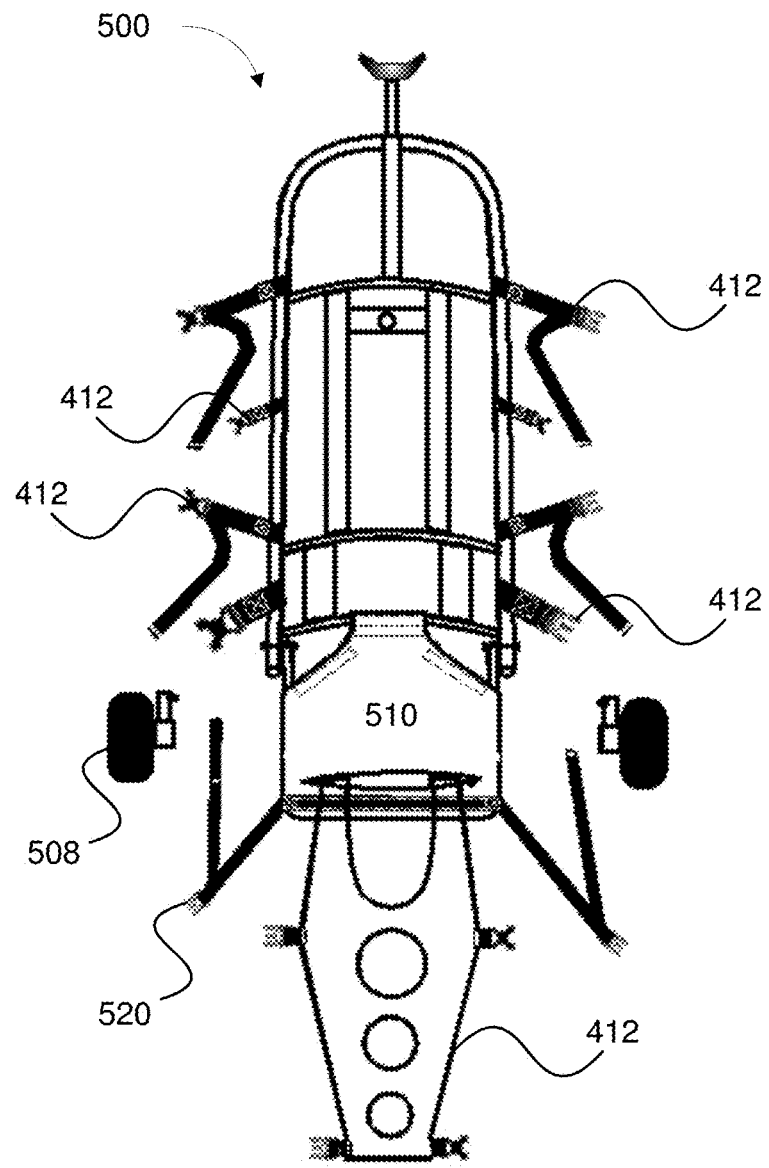
FIG. 7C depicts an exploded view of the frame of FIG. 7A with a game strap in accordance with another embodiment of the present invention.

FIG. 7C depicts an exploded view of the frame 300 of FIG. 7A with a game strap in accordance with another embodiment of the present invention. In the illustrated embodiment, the frame 300 includes various attachment elements similar to those described above with respect to the preceding figures. In the illustrated embodiment, the frame 300 include the game strap 412 attached, at a bottom portion of the game strap 412, to the horizontal section 710 of the frame 300. In some embodiments, the game strap 412 can be coupled to the frame 300 at a top of the game strap 412 to secure a load such as an animal head, cape, antlers, or other object. The horizontal section 710 includes a cover wrapped around the horizontal section 710 to provide a surface within the horizontal section 710. The illustrated embodiment also shows the wheel assemblies 708 as separated from the frame 300.

Figure 8A:
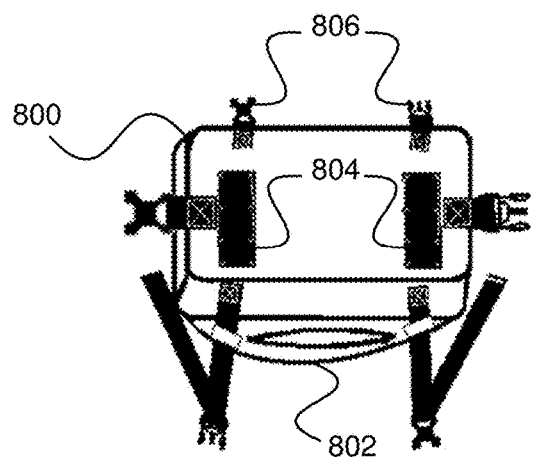
FIG. 8A depicts a perspective view of an accessory in accordance with one embodiment of the present invention.

FIG. 8A depicts a perspective view of an accessory 800 in accordance with one embodiment of the present invention. In the illustrated embodiment, the accessory includes an attachment point 802 to facilitate attachment of another component such as a game strap. The illustrated embodiment of the accessory 800 also includes second portions of a coupling mechanism 804 to interface with a first portion of a coupling mechanism such as those described with reference to FIG. 2. The illustrated embodiment also includes attachment element 806 to facilitate attachment with other accessories or components such as a harness, backpack, frame, or pouch.

Figure 8B:
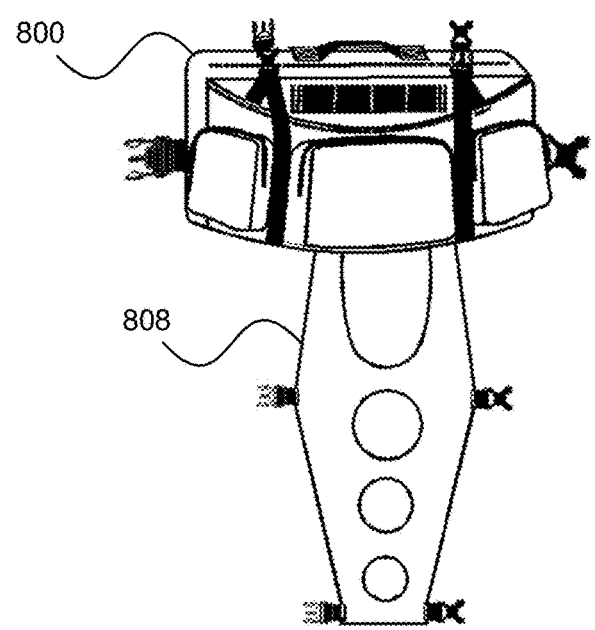
FIG. 8B depicts a perspective view of the accessory of FIG. 8A with a game strap attached in accordance with one embodiment of the present invention.

FIG. 8B depicts a perspective view of the accessory 800 of FIG. 8A with a game strap 808 attached in accordance with one embodiment of the present invention. In the illustrated embodiment, the game strap 808 is attached to a lower portion of the accessory 800. In other embodiments, the game strap 808 attaches at other points on the accessory 800. In some embodiments, the accessory 800 includes a stowage compartment to facilitate stowing of the game strap 808 within the accessory 800 when not in use. In some embodiments, stowing the game strap 808 within the accessory 800 includes detaching the game strap 808. In other embodiments, stowing the game strap 808 includes rolling or stuffing the game strap 808 into the accessory 800 without detaching the game strap 808 from the accessory 800.

Figure 8C:
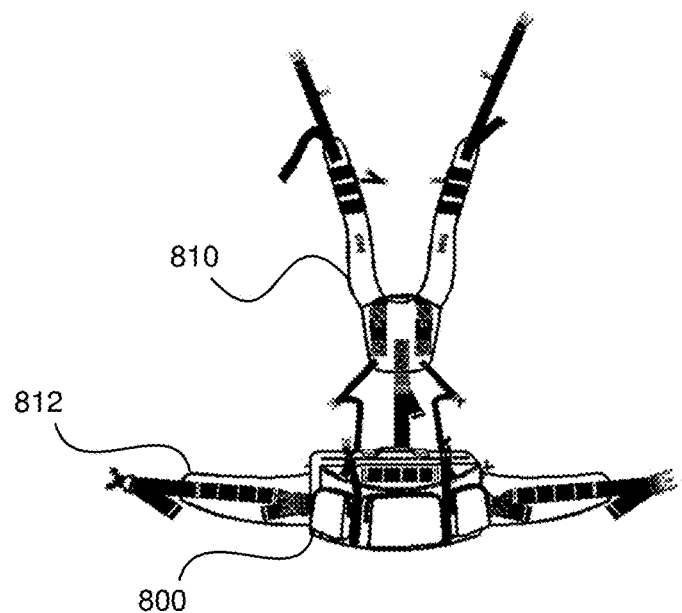
FIG. 8C depicts a perspective view of the accessory of FIG. 8A attached to a harness in accordance with one embodiment of the present invention.

FIG. 8C depicts a perspective view of the accessory 800 of FIG. 8A attached to a harness 810 in accordance with one embodiment of the present invention. In the illustrated embodiment, the accessory 800 is attached to the harness 810 at a hip belt 812 of the harness 810. In other embodiments, the accessory 800 is attached at another point on the harness 810. In some embodiments, attachment of the accessory 800 allows for additional accessories or components to be attached to the harness 810.

Figure 9A:
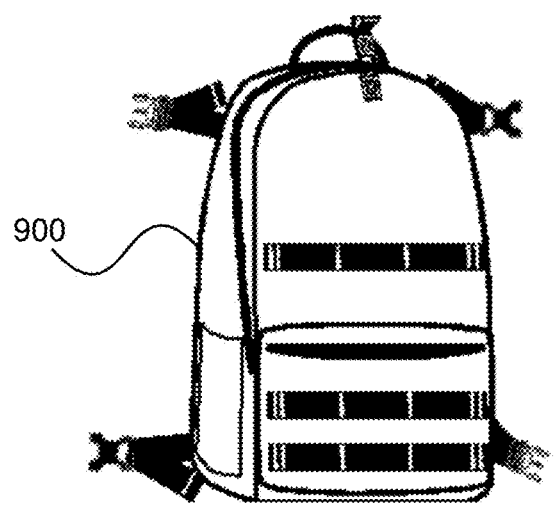
FIG. 9A depicts a perspective view of a binocular pack in accordance with one embodiment of the present invention.
Figure 9B:
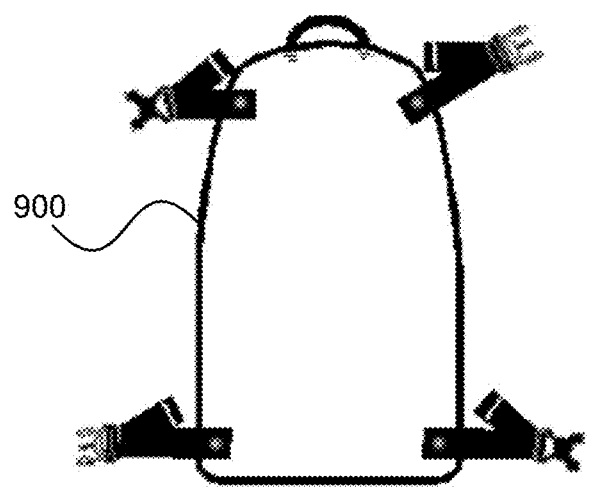
FIG. 9B depicts a rear view of the binocular pack of FIG. 9A in accordance with one embodiment of the present invention.

FIG. 9B depicts a rear view of the binocular pack 900 of FIG. 9A in accordance with one embodiment of the present invention.

Figure 9C:
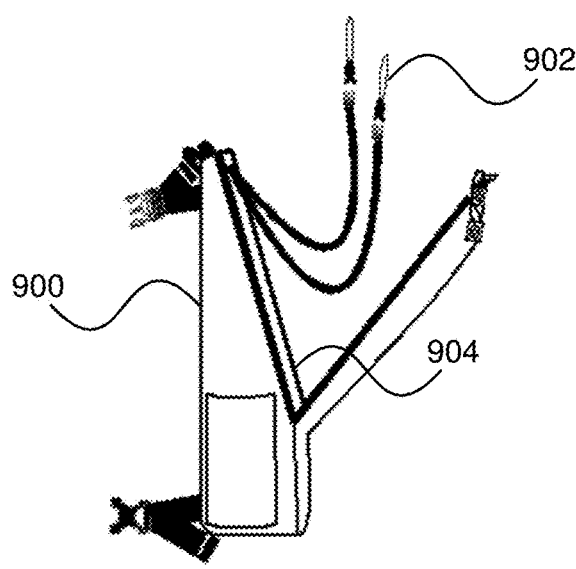
FIG. 9C depicts a side view of the binocular pack of FIG. 9A in accordance with one embodiment of the present invention.

FIG. 9C depicts a side view of the binocular pack 900 of FIG. 9A in accordance with one embodiment of the present invention. In some embodiments, the binocular pack 900 includes attachment structures 902 to facilitate attachment of supplies, equipment, or other items or accessories. For example, the attachment structure 902 may be useful to attach binocular, compass, car keys, etc. In some embodiments, the binocular pack 900 is constructed of functional layers to, for example, provide airflow, prevent water and dust intrusion, reduce weight, improve durability, etc.

In some embodiments, the binocular pack 900 includes a lip 904 to channel rain and debris away from the zipper and prevent penetration into the interior of the daypack. Additionally, in some embodiments, the lip 904 acts as a gutter to channel material away from the user as the material falls from the binocular pack 900.

Figure 9D:
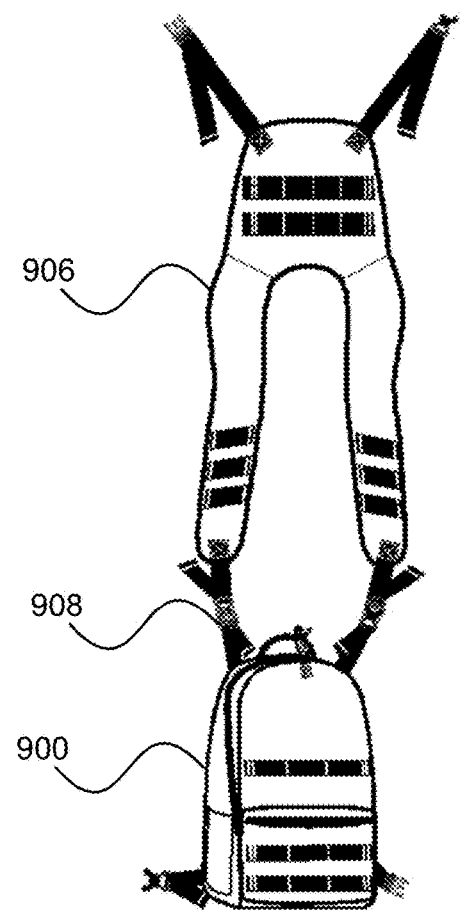
FIG. 9D depicts a schematic view of the binocular pack of FIG. 9A in accordance with one embodiment of the present invention.

FIG. 9D depicts a schematic view of the binocular pack 900 of FIG. 9A in accordance with one embodiment of the present invention. In some embodiments, the binocular pack 900 is a relatively smaller pack suitable for packing supplies needed for a day trip.

In the illustrated embodiment of FIG. 9D, the binocular pack 900 is connected to a harness 906 via a coupling structure 908. In some embodiments, the harness 906 forms the shoulder straps of the binocular pack 900 without other components. In other embodiments, the harness 906 couples to another component to allow the user to carry the binocular pack 900.

Figure 9E:
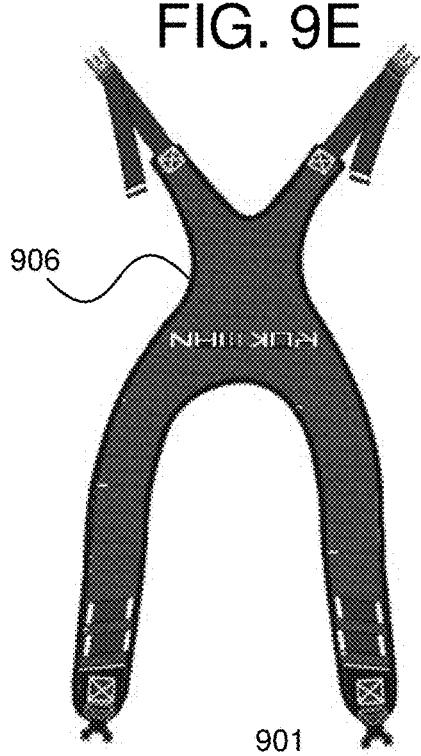
FIG. 9E depicts a schematic view of a sling in accordance with one embodiment of the present invention.

FIG. 9E depicts a schematic view of a sling 906 in accordance with one embodiment of the present invention. In the illustrated embodiment, the sling 906 provides a connection point to wear the binocular pack 900 of FIGS. 9F-H or other accessories described herein. The sling 906 is configured to be positioned on the back of a user and orient the binocular pack 900 on a chest or front side of a user for ready access.

Figure 9F:
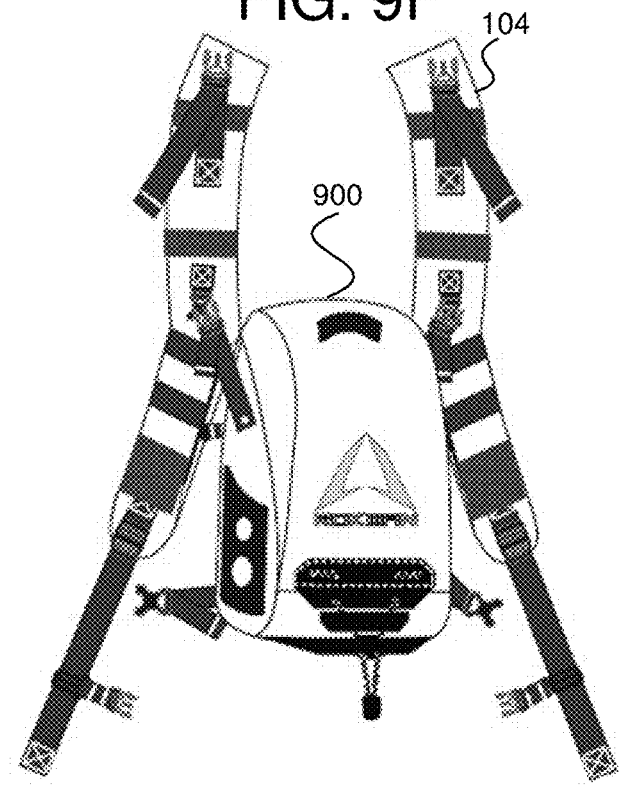
FIG. 9F depicts a perspective view of another embodiment of a binocular pack in accordance with one embodiment of the present invention.

FIG. 9F depicts a perspective view of another embodiment of a binocular pack 900 in accordance with one embodiment of the present invention. In the illustrated embodiment, the binocular pack 900 is coupled to a set of shoulder straps 104 as described above. For example, the binocular pack 900 may be coupled to the shoulder straps 104 of with the backpack, frame, or both coupled to the shoulder straps 104.

Figure 9G:
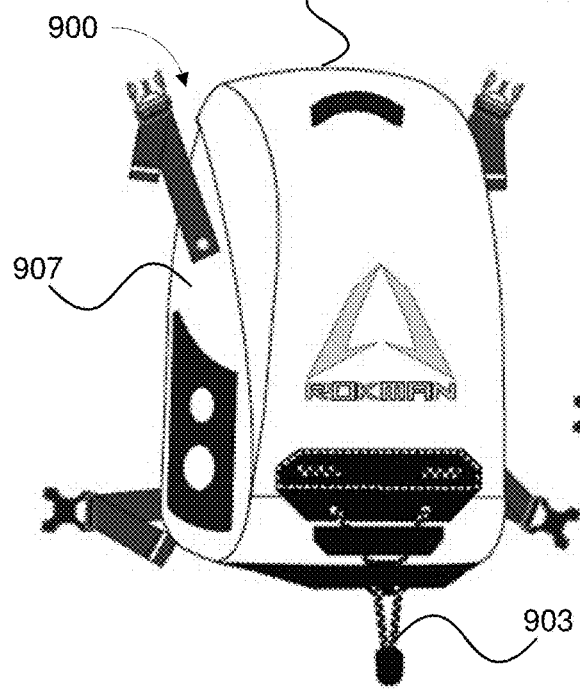
FIG. 9G depicts a perspective view of another embodiment of the binocular pack of FIG. 9F in accordance with one embodiment of the present invention.

FIG. 9G depicts a perspective view of another embodiment of the binocular pack 900 of FIG. 9F in accordance with one embodiment of the present invention. In the illustrated embodiment, the binocular pack 900 includes a lid 901 and a securing system 903. In some embodiments, the lid 901 has a hood with a scoop-like shape to capture a body 907 of the binocular pack 900. The securing system 903 provides retention force which maintains the lid 901 in place on the body 907 until released. In some embodiments, the securing system 903 includes an elastic cord to apply the retention force.

Figure 9H:
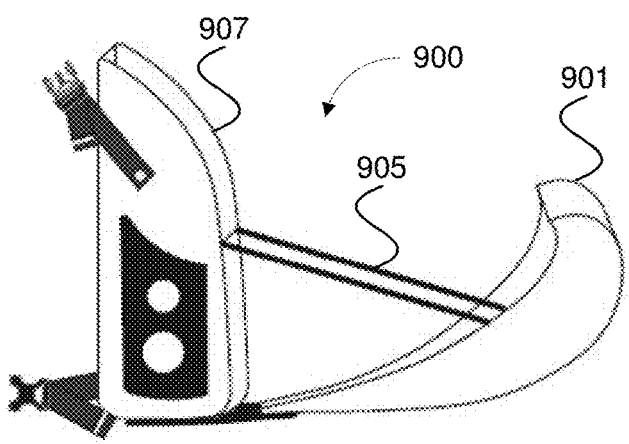
FIG. 9H depicts a side view of the binocular pack of FIG. 9G in accordance with one embodiment of the present invention.

FIG. 9H depicts a side view of the binocular pack 900 of FIG. 9G in accordance with one embodiment of the present invention. In the illustrated embodiment, the binocular pack 900 is in an open configuration. As illustrated, the lid 901 is slipped up and off the body 907 allowing the lid 901 to open. In the illustrated embodiment, the lid 901 is coupled to the body by retention structures 905. The retentions structure 905 may be cords, strings, elastics, chains, or the like.

Figure 10A:
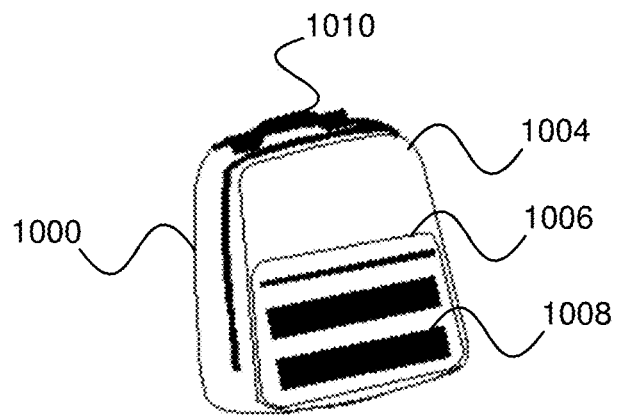
FIG. 10A depicts a perspective view of an accessory bag in accordance with one embodiment of the present invention.

FIG. 10A depicts a perspective view of an accessory bag 1000 in accordance with one embodiment of the present invention. In the illustrated embodiment, the accessory bag 1000 includes a main compartment 1004, a secondary compartment 1006, attachment points 1008 for attaching other components or accessories, and a handle 1010. Other embodiments include fewer or more structures to provide less or more functionality.

Figure 10B:
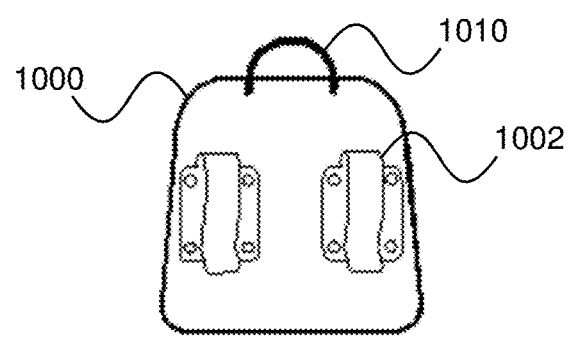
FIG. 10B depicts a rear view of the accessory bag of FIG. 10A in accordance with one embodiment of the present invention.

FIG. 10B depicts a rear view of the accessory bag 1000 of FIG. 10A in accordance with one embodiment of the present invention. In the illustrated embodiment, the accessory bag 1000 forms an enclosed compartment or multiple compartments. In some embodiments, the accessory bag 1000 is couplable to a component having a second portion of a coupling mechanism as the accessory bag 1000 includes at least one first portion of a coupling mechanism 1002.

Figure 11A:
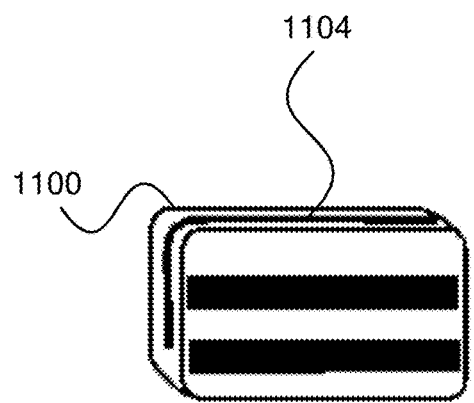
FIG. 11A depicts a perspective view of an ammunition bag in accordance with one embodiment of the present invention.

FIG. 11A depicts a perspective view of an ammunition bag 1100 in accordance with one embodiment of the present invention. In the illustrated embodiment, the ammunition bag 1100 includes a closure system 1104 to close the ammunition bag 1100.

Figure 11B:
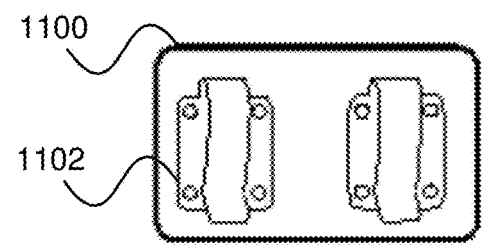
FIG. 11B depicts a rear view of the ammunition bag of FIG. 11A in accordance with one embodiment of the present invention.

FIG. 11B depicts a rear view of the ammunition bag 1100 of FIG. 11A in accordance with one embodiment of the present invention. In the illustrated embodiments, the ammunition bag 1100 includes first portions of a coupling mechanism 1102 to couple to a component having a corresponding second portion of the coupling mechanism.

Figure 11C:
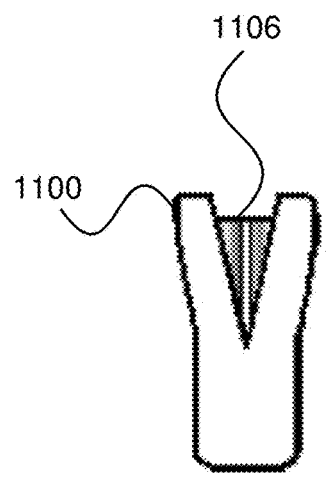
FIG. 11C depicts a side view of the ammunition bag of FIG. 11A in accordance with one embodiment of the present invention.

FIG. 11C depicts a side view of the ammunition bag 1100 of FIG. 11A in accordance with one embodiment of the present invention. In some embodiments, the ammunition bag 1100 and the closure system 1104 provide a water-tight compartment to store ammunition 1106 within the ammunition bag 1100.

Figure 12A:
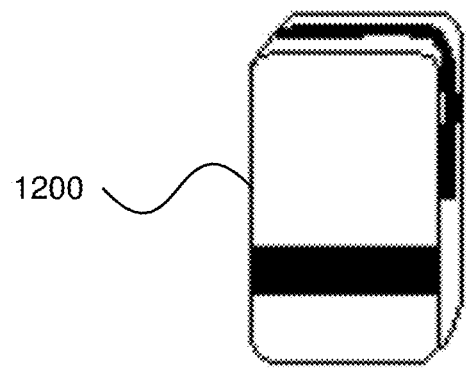
FIG. 12A depicts a perspective view of an electronics bag in accordance with one embodiment of the present invention.

FIG. 12A depicts a perspective view of an electronics bag 1200 in accordance with one embodiment of the present invention. In the illustrated embodiment, the electronic bag 1200 provides a compartment to store one or more electronic devices. In some embodiments, the electronics bag 1200 provides a water-tight storage area to prevent damage to water-sensitive electronic devices.

Figure 12B:
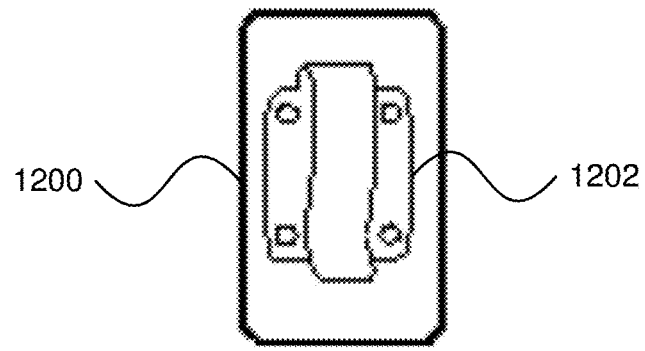
FIG. 12B depicts a rear view of the electronics bag of FIG. 12B in accordance with one embodiment of the present invention.

FIG. 12B depicts a rear view of the electronics bag 1200 of FIG. 12B in accordance with one embodiment of the present invention. In the illustrated embodiment, the electronics bag 1200 includes a first portion of a coupling mechanism 1202 to facilitate attachment of the electronics bag 1200 to another component or system. In some embodiments, the electronics bag 1200 includes other features with additional functionality. For example, the electronics bag 1200 may include an audio headphone through port to allow access to devices within the electronics bag 1200 while using headphones.

Figure 13A:
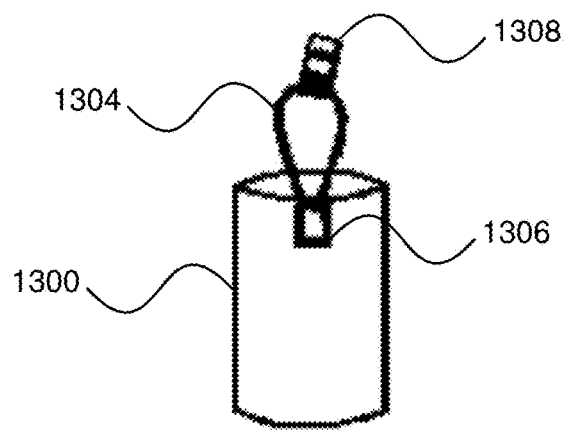
FIG. 13A depicts a front view of a bottle bag in accordance with one embodiment of the present invention.

FIG. 13A depicts a front view of a bottle bag 1300 in accordance with one embodiment of the present invention. In the illustrated embodiment, the bottle bag 1300 includes an approximately cylindrical sleeve with open ends. In some embodiments, the bottle bag 1300 includes insulating material to reduce thermal conduction through the bottle bag 1300. In the illustrated embodiment, the bottle bag 1300 also includes a securing component 1304 coupled to the bottle bag 1300 at a connection point 1306. The securing component 1304 may also include a pull-tab 1308 to facilitate interaction by a user. In some embodiments, the securing component 1304 is configured to loop over the top of a bottle, such as a water bottle, to secure the bottle within the bottle bag 1300. The pull-tab 1308 allows a user to quickly and easily apply or remove the securing component on the bottle while the connection point 1306 retains the securing component 1304 on the bottle bag 1300. In some embodiments, the securing component 1304 is or includes an elastic material.

Figure 13B:
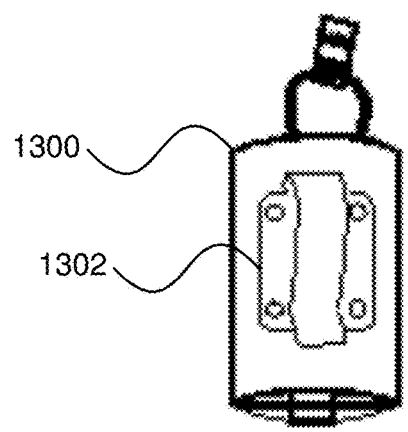
FIG. 13B depicts a rear view of the bottle bag of FIG. 13A in accordance with one embodiment of the present invention.

FIG. 13B depicts a rear view of the bottle bag 1300 of FIG. 13A in accordance with one embodiment of the present invention. In some embodiments, the bottle bag 1300 includes a first portion of a coupling mechanism 1302 to facilitate attachment of the bottle bag 1300 to another component or system.

Figure 13C:
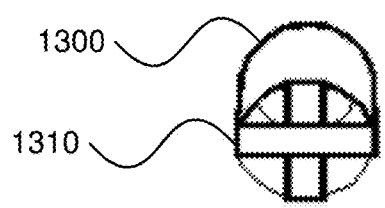
FIG. 13C depicts an underside view of the bottle bag of FIG. 13A in accordance with one embodiment of the present invention.

FIG. 13C depicts an underside view of the bottle bag of FIG. 13A in accordance with one embodiment of the present invention. In the illustrated embodiment, the bottle bag 1300 includes a bottom closure 1310. In some embodiments, the bottom closure 1310 is one or more straps crossed over the bottom end of the bottle bag 1300. The strap arrangement of the bottom closure 1310 allows condensation or spilled liquids to escape the bottle bag 1300. In other embodiments, the bottom closure 1310 is a solid closure to prevent entry of dust and dirt and to prevent transfer of heat though the bottle bag 1300.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A backpack apparatus comprising:
a backpack harness comprising a vertical support element, shoulder straps and a hip belt, the shoulder straps and hip belt coupled to the vertical element, the backpack harness comprising a first portion of a coupling mechanism; and
an external frame comprising a backpack coupling mechanism and a first instance of a second portion of the coupling mechanism; and
a backpack comprising a second instance of the second portion of the coupling mechanism, wherein each instance of the second portion of the coupling mechanism couples with the first portion of the coupling mechanism, wherein the backpack coupling mechanism of the external frame is releasably couplable with the backpack, and wherein the backpack apparatus is configurable as:
  the backpack harness coupled to the external frame;
  the backpack harness coupled to the backpack; and
  the backpack harness coupled to the external frame while the external frame is coupled to the backpack.

2. The apparatus of claim 1, wherein the backpack harness comprises a first portion of a coupling and the external frame comprises a first portion of the coupling and the external frame comprises a first instance of a second portion of the coupling and the backpack comprises a second instance of a second portion of the coupling, wherein the coupling mechanism differs from the coupling and wherein:
  the external frame releasably couples to the backpack harness via the coupling mechanism and by releasably coupling the first portion of the coupling on the backpack harness to the second portion of the coupling on the external frame; and
  the backpack releasably couples to the backpack harness via the coupling mechanism and by releasably coupling the first portion of the coupling on the backpack harness to the second portion of the coupling on the backpack.

3. The apparatus of claim 2, wherein each portion of the coupling mechanism is located on a lower portion of the backpack harness, the external frame, and the backpack and each portion of the coupling is located on an upper portion of the backpack harness, the external frame, and the backpack, the lower portions are positioned toward the hips of a user and the upper portions are positioned towards the head of the user.

4. The apparatus of claim 3, wherein the first portion of the coupling mechanism on the backpack harness is located on the hip belt.

5. The apparatus of claim 2, wherein the external frame couples to the backpack harness with two coupling mechanisms and two or more couplings and the backpack couples to the external frame with two coupling mechanisms and two or more couplings and the backpack couples to the external frame with two or more couplings.

6. The apparatus of claim 2, wherein the coupling comprises one of a pin stud and corresponding opening, a buckle, a hook and loop fastener, a snap, a clip, a double D-ring connector, and a cam-buckle connector.

7. The apparatus of claim 6, wherein the opening corresponding to the pin stud comprises a grommet and the pin stud comprises a hole in an end distal to where the pin stud is attached, the hole sized to accommodate a locking device, wherein when the pin stud is inserted into the grommet, the hole in the pin stud is exposed through the grommet and the locking device inserted through the hole prevents the pin stud from exiting the grommet.

8. The apparatus of claim 1, wherein the first portion of each coupling mechanism comprises a first end of a horizontal section coupled to a first end of a vertical section, a second end of the vertical section distal to the first end of the vertical section extends upward, wherein a second end of the horizontal is coupled to the backpack or to the external frame.

9. The apparatus of claim 8, wherein the second portion of each coupling mechanism comprises a downward facing recess, wherein a first portion of a coupling mechanism couples to a second portion of the coupling mechanism by sliding the recess of the second portion of the coupling mechanism over the vertical section of the first portion of the coupling mechanism.

10. The apparatus of claim 2, further comprising an accessory, wherein the backpack comprises a first portion of the coupling and the accessory comprises a second portion of the coupling and the accessory releasably couples to the backpack, to the external frame, and to the backpack harness.

11. The apparatus of claim 10, wherein the accessory comprises one or more of a binocular case, a daypack, a fanny pack, and a pouch.

12. The apparatus of claim 1, wherein the first portion of the coupling mechanism of the backpack harness supports a weight of the external frame and an expected weight of the backpack.

13. The apparatus of claim 1, wherein the external frame comprises a horizontal section pivotably coupled to a bottom portion of a vertical section of the external frame, wherein the horizontal section rotates between a vertical position and a horizontal position.

14. The apparatus of claim 1, wherein at least one of the external frame and the backpack comprises a game strap, a bottom of the game strap coupled to at least one of the external frame and the backpack and a top of the game strap releasably coupled to at least one of the external frame and the backpack, wherein the game strap comprises one or more openings located between the top and the bottom of the game strap, the one or more openings sized to accommodate a snout of a head of an animal, wherein the top of the game strap is oriented toward a head of a user and the bottom of the game strap is oriented toward the hips of a user.

15. The apparatus of claim 14, wherein the game strap is sized for a head, antlers, and a cape of an animal, wherein the antlers protrude beyond the top of the game strap when the top of the game strap is releasably coupled to the at least one of the external frame and the backpack.

16. A backpack apparatus comprising:
  a backpack harness comprising a vertical support element, shoulder straps and a hip belt, the shoulder straps, and hip belt coupled to the vertical support element, the backpack harness comprising a first portion of a coupling mechanism and a first portion of a coupling;
  an external frame comprising a second portion of the coupling mechanism and a first portion of the coupling and a second portion of the coupling, wherein the external frame releasably couples to the backpack harness by coupling the first portion of the coupling mechanism on the backpack harness to the second portion of the coupling mechanism on the external frame and the first portion of the coupling on the backpack harness to the second portion of the buckle coupling on the external frame; and
  a backpack comprising a second portion of the coupling mechanism and a second portion of the coupling, wherein the backpack releasably couples to the backpack harness by coupling the first portion of the coupling mechanism on the backpack harness to the second portion of the coupling mechanism on the backpack and the first portion of the coupling on the backpack harness to the second portion of the coupling on the backpack, and the backpack releasably couples to the external frame by coupling the first portion of the coupling of the external frame to the second portion of the coupling of the backpack,
  wherein, when the backpack apparatus is worn by a user, each portion of the coupling mechanism is located on a lower portion of the backpack harness, the external frame and the backpack and each portion of the coupling is located on an upper portion of the backpack harness, the external frame, and the backpack, wherein the lower portions are oriented toward the hips of a user and the upper portions are oriented toward the head of a user.

17. The apparatus of claim 16, wherein the first portion of each coupling mechanism comprises an L-shape comprising a horizontal section and a vertical section, a first end of the horizontal section coupled to a first end of the vertical section, a second end of the vertical section distal to the first end of the vertical section extends upward, wherein a second end of the horizontal section is coupled to the backpack or to the external frame and wherein the second portion of each coupling mechanism comprises a downward facing recess, wherein a first portion of a coupling mechanism couples to a second portion of the coupling mechanism by sliding the recess of the second portion of the coupling mechanism over the vertical section of the first portion of the coupling mechanism.

18. The apparatus of claim 16, wherein the external frame comprises a horizontal section pivotably coupled to a bottom portion of a vertical section of the external frame, wherein the horizontal section rotates between a vertical position and a horizontal position.

19. The apparatus of claim 16, wherein at least one of the external frame and the backpack comprises a game strap, a bottom of the game strap coupled to the at least one of the external frame and the backpack and a top of the game strap releasably coupled to the at least one of the external frame and the backpack, wherein the game strap comprises one or more openings located between the top and the bottom of the game strap, the one or more openings sized to accommodate a snout of a head of an animal.

* * * * *